(12) United States Patent
Abdelghaffar et al.

(10) Patent No.: US 12,463,759 B2
(45) Date of Patent: Nov. 4, 2025

(54) FREQUENCY HOPPING FOR DATA CHANNEL REPETITION IN FULL DUPLEX

(71) Applicant: QUALCOMM Incorporated, San Diego, CA (US)

(72) Inventors: Muhammad Sayed Khairy Abdelghaffar, San Jose, CA (US); Gokul Sridharan, Sunnyvale, CA (US); Abdelrahman Mohamed Ahmed Mohamed Ibrahim, San Diego, CA (US); Hung Dinh Ly, San Diego, CA (US); Ahmed Attia Abotabl, San Diego, CA (US); Hwan Joon Kwon, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 918 days.

(21) Appl. No.: 17/653,166

(22) Filed: Mar. 2, 2022

(65) Prior Publication Data

US 2023/0283418 A1    Sep. 7, 2023

(51) Int. Cl.
H04L 5/00       (2006.01)
H04L 1/08       (2006.01)
H04L 5/14       (2006.01)
H04W 72/0446    (2023.01)
H04W 72/1263    (2023.01)

(52) U.S. Cl.
CPC .............. *H04L 5/0012* (2013.01); *H04L 1/08* (2013.01); *H04L 5/14* (2013.01); *H04W 72/0446* (2013.01); *H04W 72/1263* (2013.01)

(58) Field of Classification Search
CPC ........... H04L 5/0012; H04L 1/08; H04L 5/14; H04W 72/0446; H04W 72/1263
See application file for complete search history.

(56) References Cited

U.S. PATENT DOCUMENTS

2022/0007395 A1*  1/2022  Lei ..................... H04L 1/0003

FOREIGN PATENT DOCUMENTS

| EP | 4203369 A1 | 6/2023 | |
| WO | WO-2021227828 A1 * | 11/2021 | ............... H04L 5/14 |
| WO | 2022039580 A1 | 2/2022 | |

OTHER PUBLICATIONS

International Search Report and Written Opinion—PCT/US2023/062278—ISA/EPO—Jul. 11, 2023.

(Continued)

*Primary Examiner* — Basil Ma
(74) *Attorney, Agent, or Firm* — Patterson & Sheridan, LLP

(57) ABSTRACT

Certain aspects of the present disclosure provide techniques for frequency hopping for data channel repetition in full duplex. A method performed by a user equipment (UE) includes receiving information from, a network entity, scheduling transmission of a plurality of uplink data channel repetitions in one or more slots according to a frequency hopping scheme that configures frequency hops between transmissions of repetitions of the plurality of uplink data channel repetitions and transmitting the plurality of uplink data channel repetitions in the one or more slots, the one or more slots comprising at least a full duplex slot including an uplink subband and a downlink subband.

30 Claims, 18 Drawing Sheets

(56) References Cited

OTHER PUBLICATIONS

Moderator (CATT) : "Summary #1 of Subband Non-overlapping Full Duplex", 3GPP TSG RAN WG1 #11 Obis-e, R1-2210314, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 10, 2022-Oct. 19, 2022, Oct. 12, 2022, 99 Pages, XP052259782, Sect. 2.1.3.4.

Moderator (CATT) (Merias P., et al.,) : "Summary #2 of Subband Non-Overlapping Full Duplex", 3GPP TSG RAN WG1 #111, R1-2212734, Type Discussion, FS_NR_Duplex_EVO, 3rd Generation Partnership Project (3GPP), Mobile Competence Centre, 650, Route Des Lucioles, F-06921, Sophia-Antipolis Cedex, France, vol. 3GPP RAN 1, No. Toulouse, FR, Nov. 14, 2022-Nov. 18, 2022, Nov. 17, 2022, 108 Pages, XP052223281, Sect.s 3.1.2.4.4, 3.1.2.4.5.

\* cited by examiner

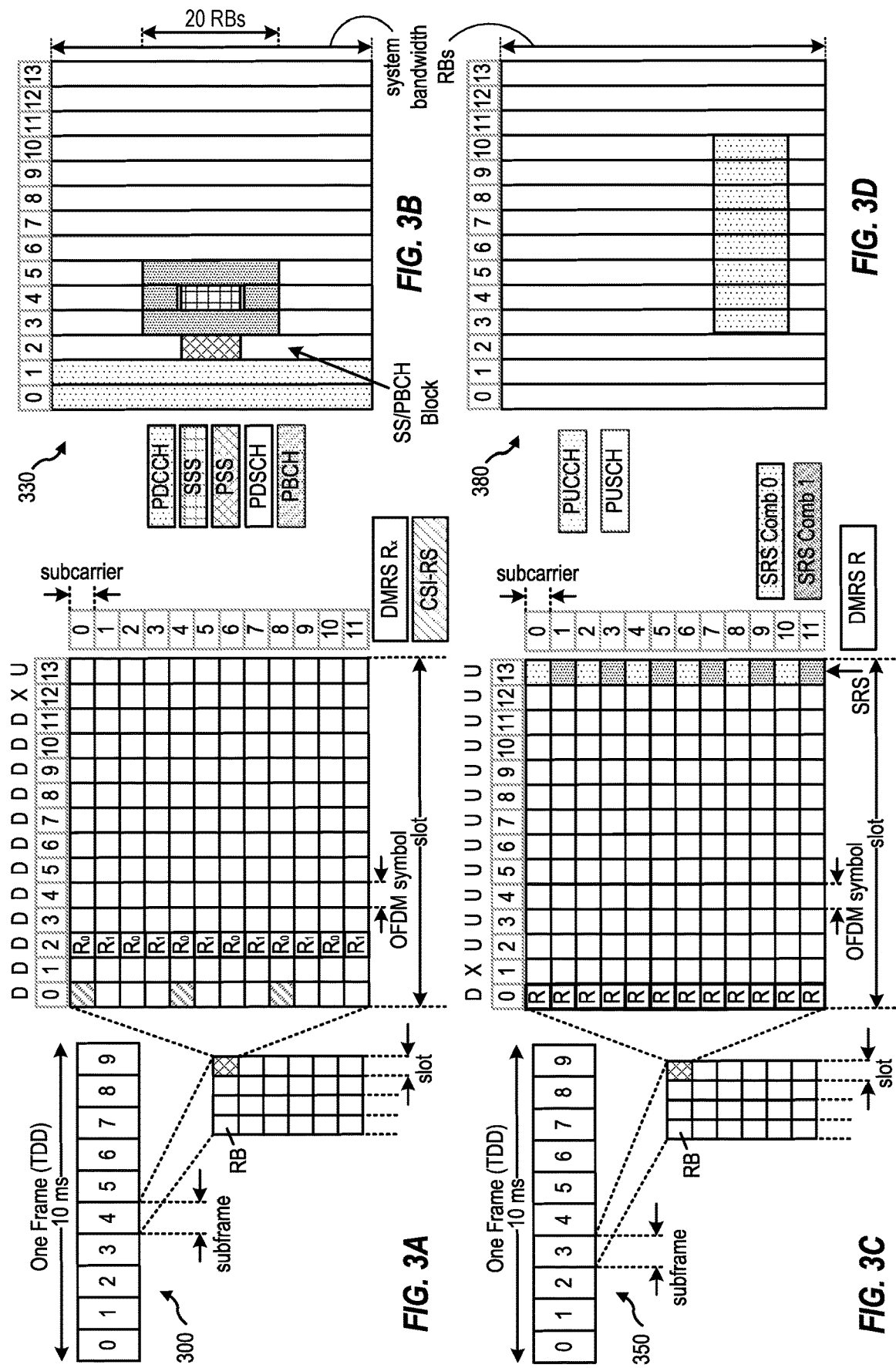

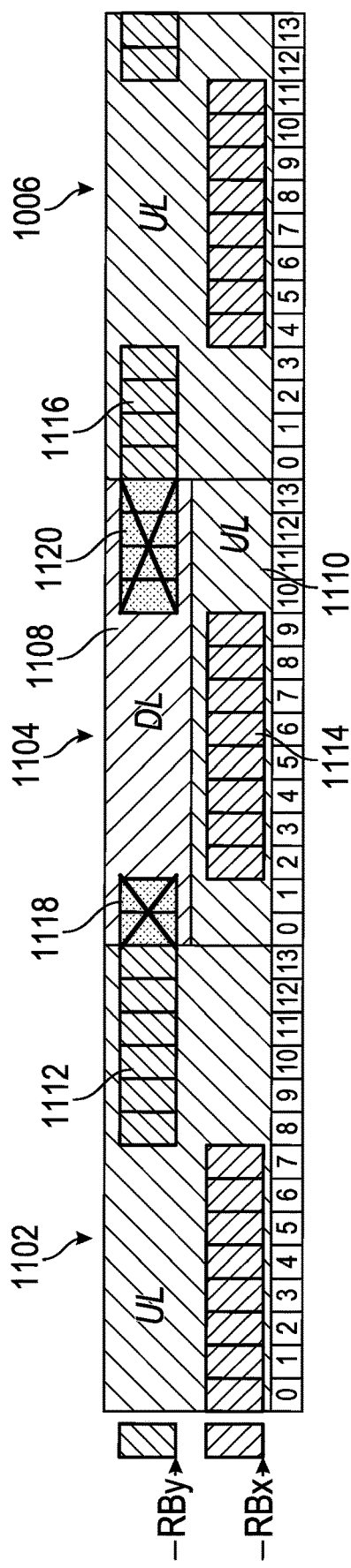
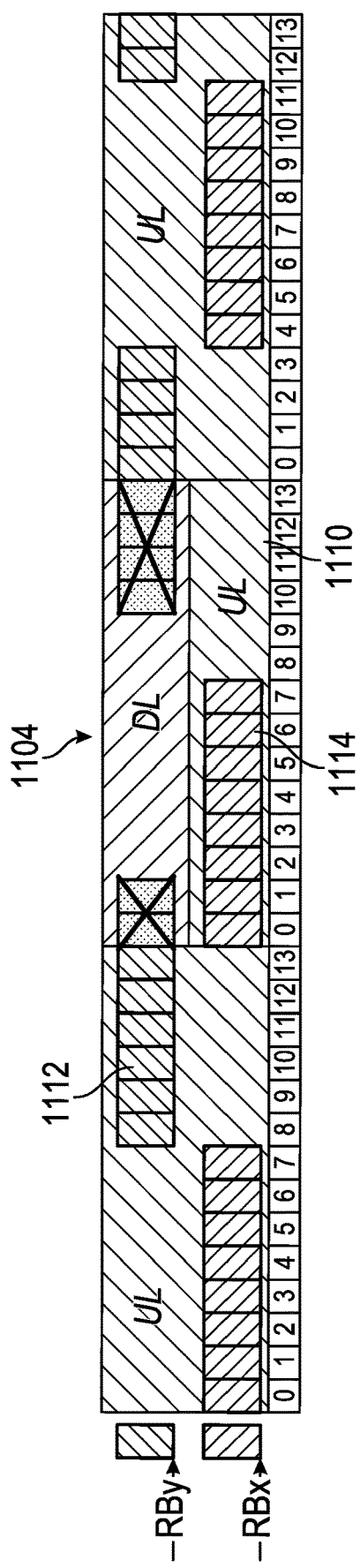
FIG. 11A
FIG. 11B

FREQUENCY HOPPING FOR DATA CHANNEL REPETITION IN FULL DUPLEX

BACKGROUND

Field of the Disclosure

Aspects of the present disclosure relate to wireless communications, and more particularly, to techniques for frequency hopping for data channel repetition in full duplex.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method performed by a user equipment (UE). The method includes receiving information, from a network entity, scheduling transmission of a plurality of uplink data channel repetitions in one or more slots according to a frequency hopping scheme that configures frequency hops between transmissions of repetitions of the plurality of uplink data channel repetitions and transmitting the plurality of uplink data channel repetitions in the one or more slots, the one or more slots comprising at least a full duplex slot including an uplink subband and a downlink subband.

One aspect provides a method performed by a network entity. The method includes transmitting information, to a user equipment (UE), scheduling transmission of a plurality of uplink data channel repetitions in one or more slots according to a frequency hopping scheme that configures frequency hops between transmissions of repetitions of the plurality of uplink data channel repetitions and receiving the plurality of uplink data channel repetitions in the one or more slots, the one or more slots comprising at least a full duplex slot including an uplink subband and a downlink subband.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

FIGS. 11A and 11B illustrate an example of another slot availability rule.

DETAILED DESCRIPTION

Figure 1:
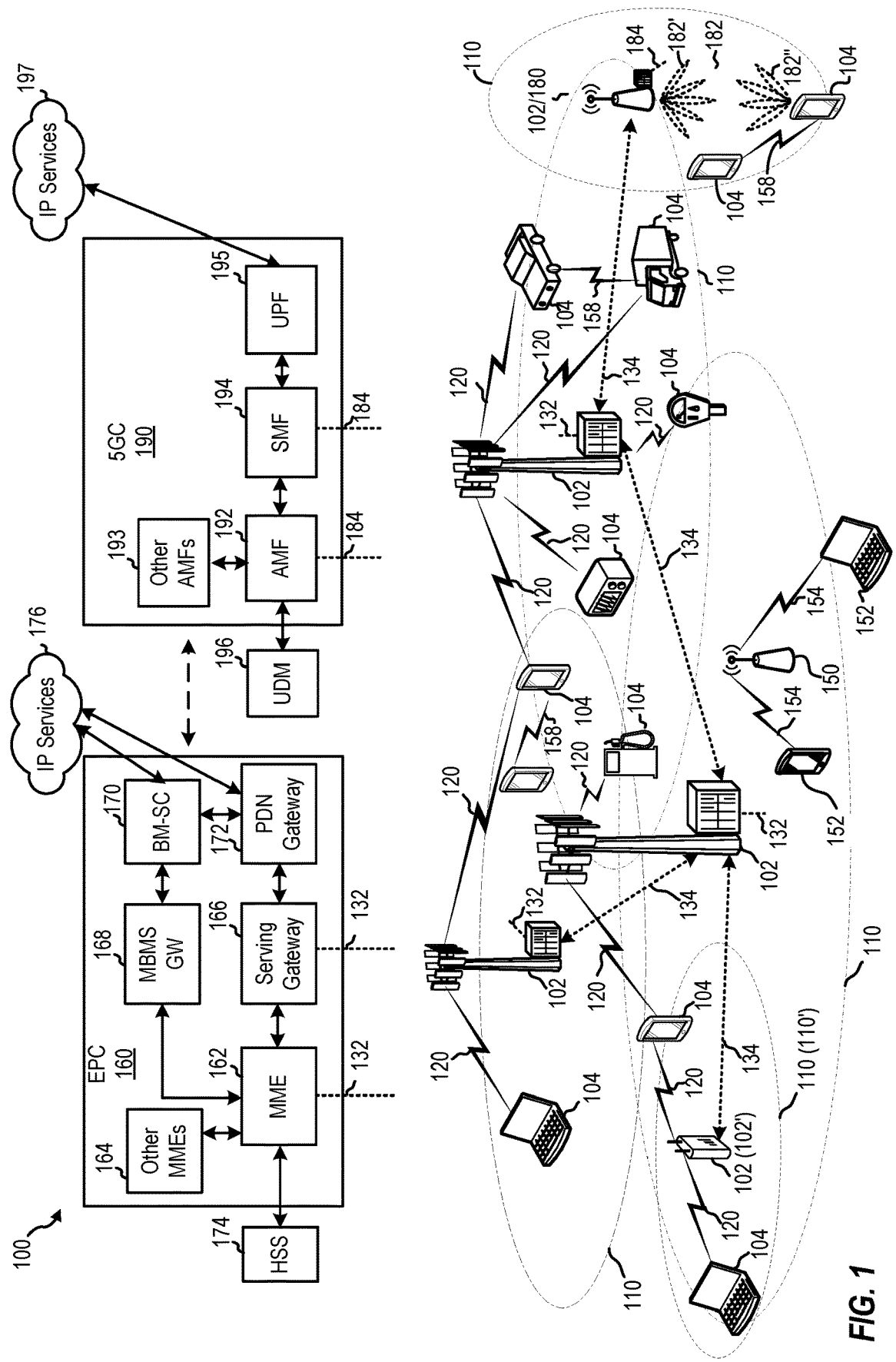
FIG. 1 is a block diagram conceptually illustrating an example wireless communication network.

Aspects of the present disclosure provide apparatuses, methods, processing systems, and computer-readable mediums for frequency hopping for data channel repetition in full duplex.

A user equipment (UE) in a wireless network may be scheduled to transmit uplink data in a transport block (TB) via a physical uplink shared channel (PUSCH). In some cases, to improve data transmission coverage of uplink transmissions, the UE may repeat transmission of the TB over multiple slots, known as PUSCH repetition. In some cases, multiple copies (e.g., repetitions) may be transmitted within one slot or may be transmitted over multiple slot. In some cases, when transmitting PUSCH repetitions, a technique known as frequency hopping may be used, which configures frequency hops between transmission of PUSCH repetitions such that a first PUSCH repetition is transmitted using a first set of frequency hopping resources while a second PUSCH repetition may be transmitted using a second set of frequency hopping resources.

When transmitting PUSCH repetitions, these PUSCH repetitions must be transmitted within uplink resources (e.g., an uplink subband) of a slot. In legacy systems, symbols within a slot allocated for PUSCH repetition transmission included only uplink frequency resources (e.g., only an uplink subband). However, in emerging systems, there may be cases in which subband full-duplex (SBFD) is supported by a base station within certain slots. SBFD may result, in some cases, in symbols of a slot, in which PUSCH repetitions are to be transmitted, having frequency resources (e.g., uplink subbands) allocated for uplink transmissions as well as frequency resources (e.g., downlink subbands) allocated for downlink transmissions. In other words, there may be cases in which frequency resources in a slot may be split among frequency resources for uplink transmissions and frequency resources for downlink transmissions.

SBFD slots may cause issues when transmitting PUSCH repetitions with frequency hopping as there may be cases in which, due to a frequency hop, frequency hopping resources over which the PUSCH repetitions are scheduled to be transmitted may not coincide with the frequency resources allocated for the uplink transmission within the SBFD slots. For example, in some cases, the frequency hopping resources for transmitting these PUSCH repetitions may occur within frequency resources allocated to downlink transmissions. If the UE were to proceed with transmitting these PUSCH repetitions, these PUSCH repetitions may cause interference to these downlink transmissions. This interference may lead to both the PUSCH repetitions and downlink transmissions having to be retransmitted, unnecessarily wasting time and frequency resources within the wireless network and power resources within the devices performing the retransmissions. In other cases, if the UE were to decide to drop the transmission of these PUSCH repetitions, latency associated with transmitting these PUSCH repetitions would increase, causing poor user experience.

Therefore, aspects of the present disclosure provide techniques for helping to resolve these issues when using frequency hopping to transmit PUSCH repetitions in full duplex slots (e.g., SBFD slots). In some cases, these techniques may include, when scheduled to transmit PUSCH repetitions according to a frequency hopping scheme, a UE may transmit PUSCH repetitions in one or more slots according to a slot availability rule that takes into account whether frequency hopping resources within the one or more slots are available for transmission of the plurality of uplink data channel repetitions. In some cases, the slot availability rule may be used by the UE when determining which slot to transmit the PUSCH repetitions in. In other cases, different sets of frequency hopping resources may be used for transmitting PUSCH repetitions in full-duplex slots as compared to non-full-duplex slots. For example, in some cases, the frequency hopping resources for transmitting these PUSCH repetitions may be selected such that they coincide with frequency resources allocated for uplink transmissions within the full-duplex slots. By transmitting PUSCH repetitions only within available slots or using different frequency hopping resources that coincide with the frequency resources for uplink transmissions of a slot, the number of retransmissions and/or number of dropped PUSCH repetitions may be decreased, reducing the wasted time, frequency, and power resources.

Introduction to Wireless Communication Networks

FIG. 1 depicts an example of a wireless communication network 100, in which aspects described herein may be implemented.

Generally, wireless communication network 100 includes various network entities (alternatively, network elements or network nodes), which are generally logical entities associated with, for example, a communication device and/or a communication function associated with a communication device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming. In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

In various aspects, a network entity or network node can be implemented as an aggregated base station, as a disaggregated base station, an integrated access and backhaul (IAB) node, a relay node, a sidelink node, to name a few examples.

Figure 2:
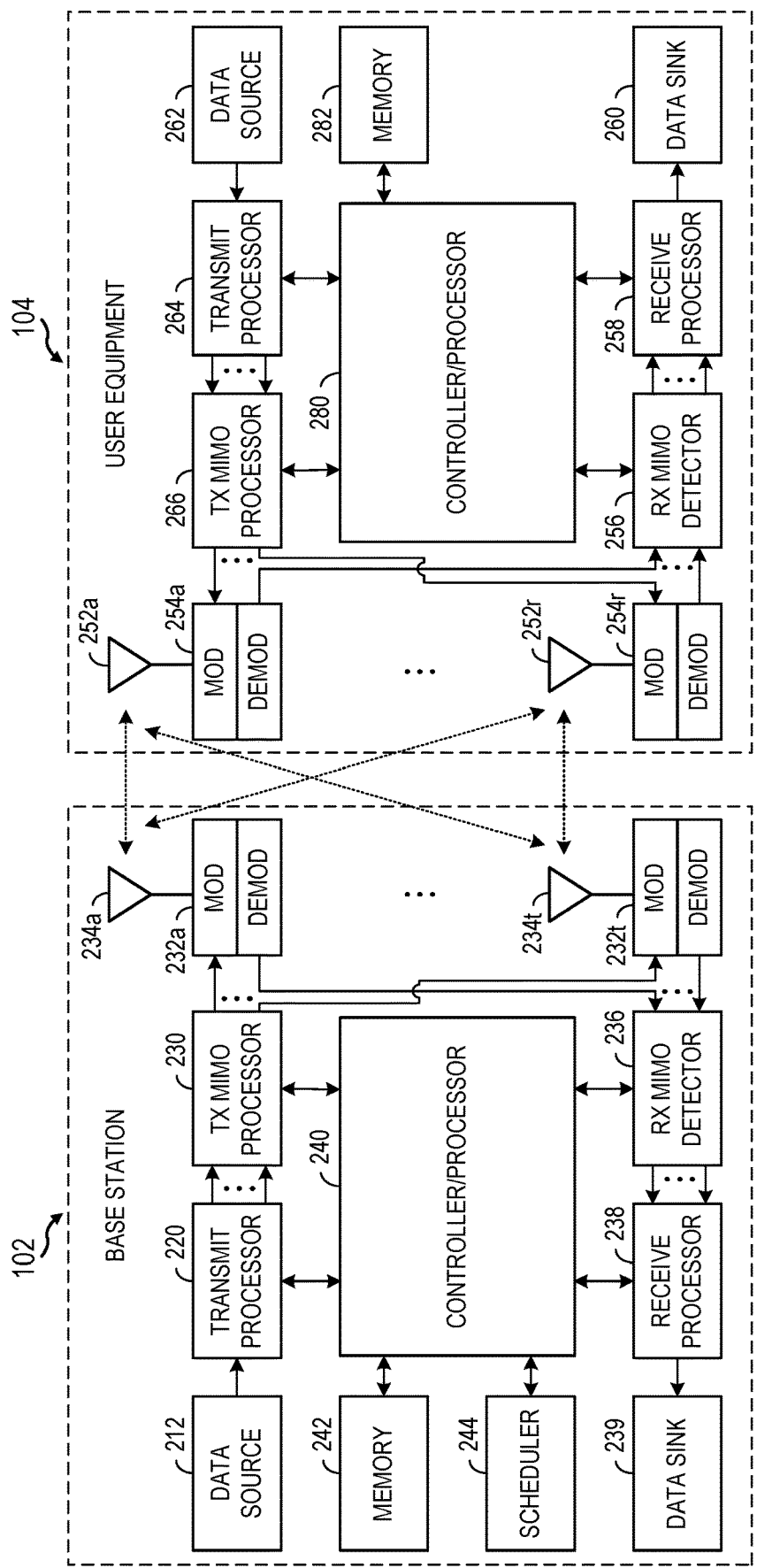
FIG. 2 is a block diagram conceptually illustrating aspects of an example base station and an example user equipment.

FIG. 2 depicts aspects of an example BS 102 and a UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104. BS 102 includes controller/processor 240, which may be configured to implement various functions described herein related to wireless communications.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260). UE 104 includes controller/processor 280, which may be configured to implement various functions described herein related to wireless communications.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to Multi Antenna Panel and Full Duplex Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 13A:
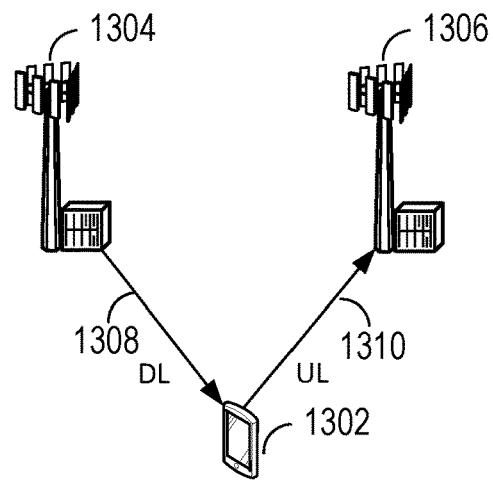
FIGS. 13A, 13B, and 13C illustrates different full duplex use cases within a wireless communication network.
Figure 13B:
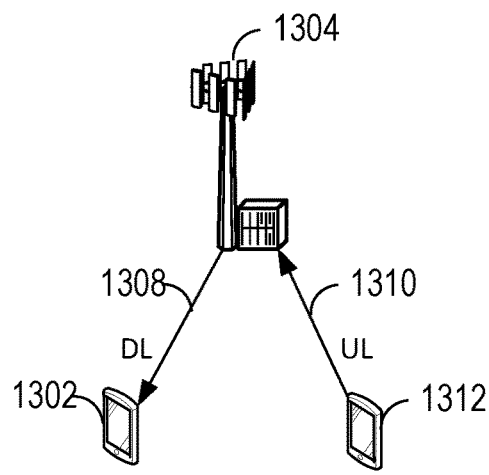
Figure 13C:
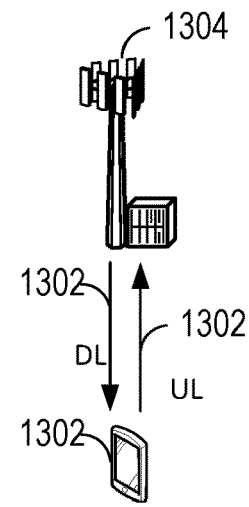

FIGS. 13A, 13B, and 13C illustrates different FD use cases within a wireless communication network, such as the wireless communication network 100. For example, FIG. 13A illustrates a first FD use case involving transmission between one UE 1302 and two base stations (or multiple transmission reception points (mTRP)), BS 1304 and BS 1306. In some cases, UE 1302 may be representative of UE 104 of FIG. 1 and BSs 1304, 1306 may be representative of BS 102 of FIG. 1. As shown, the UE 1302 may simultaneously receive DL transmissions 1308 from the BS 1306 and transmit UL transmissions 1310 to the BS 1306. In some cases, the DL transmissions 1308 and UL transmissions 1310 may be performed using different antenna panels to facilitate the simultaneous transmission and reception.

A second FD use case is illustrated in FIG. 13B involving two different UEs and one BS. As illustrated, the UE 1302 may receive DL transmissions 1308 from the BS 1304 while another UE 1312 may simultaneously transmit UL transmission 1310 to the BS 1304. Thus, in this example, BS 1304 is conducting simultaneous uplink and downlink communications.

A third FD use case is illustrated in FIG. 13C involving one BS and one UE. As illustrated, the UE 1302 may receive DL transmissions 1308 from the BS 1304 and may simultaneously transmit UL transmissions 1310 to the BS 1304. As noted above, such simultaneous reception/transmission by the UE 1302 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 13A) for mTRP |
| FD enabled | FD disabled | Use case #2 (FIG. 13B) + R-16 IAB |
| FD enabled | FD enabled | Use case #3 (FIG. 13C) |

As shown, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 13A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 13B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 13C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Aspects Related to Frequency Hopping for Data Channel Repetition in Full Duplex

In some cases, a user equipment (UE) may be scheduled to transmit uplink data on a physical uplink shared channel (PUSCH). A base station (BS) may schedule uplink transmissions on the PUSCH by transmitting downlink control information (DCI) to the UE that includes a dynamic grant (DG) or may transmit or radio resource control (RRC) signaling to the UE that includes a configured grant (CG).

DGs may include an indication of one or more time and frequency resources for transmitting an uplink transmission on the PUSCH. In some cases, the one or more time and frequency resources may be non-periodic and may be allocated to the UE for a particular uplink transmission. As such, when another uplink transmission needs to be scheduled for the UE, the BS may transmit another dynamic grant with additional scheduling information for this other uplink transmission. Conversely, CGs allocate a periodic set of time and frequency resources to the UE, which may be shared with multiple other UEs. For example, a base station may transmit a CG that allocates the resources to multiple UEs, and the UEs may randomly utilize the resources when they have data to transmit.

When scheduled, the UE may transmit uplink data in a transport block (TB) on the PUSCH. In some cases, to improve data transmission coverage of uplink transmissions, the UE may repeat transmission of the TB over multiple slots, known as PUSCH repetition. In some cases, one TB may be transmitted in one slot and multiple copies (e.g., repetitions) of the TB may be transmitted over multiple slots. The multiple copies/repetitions of the TB may be transmitted using different redundancy versions (RVs).

In some aspects, performance may be improved by transmitting one TB over time resources in multiple slots. In other words, a single TB may span across multiple slots, reducing the modulation and coding scheme (MCS) (e.g., code rate) associated with the TB. The reduced code rate results in increased reliability associated with data transmission. Channel coverage may be improved by repeating the same data (possibly with different RVs) in multiple TBs, allowing a receiver (e.g., BS) to combine the TBs for decoding of the data.

Different types of PUSCH repetition may be used, such as PUSCH repetition type-A and PUSCH repetition type-B. Both PUSCH repetition types may be applicable to DG and CG.

Figure 4A:
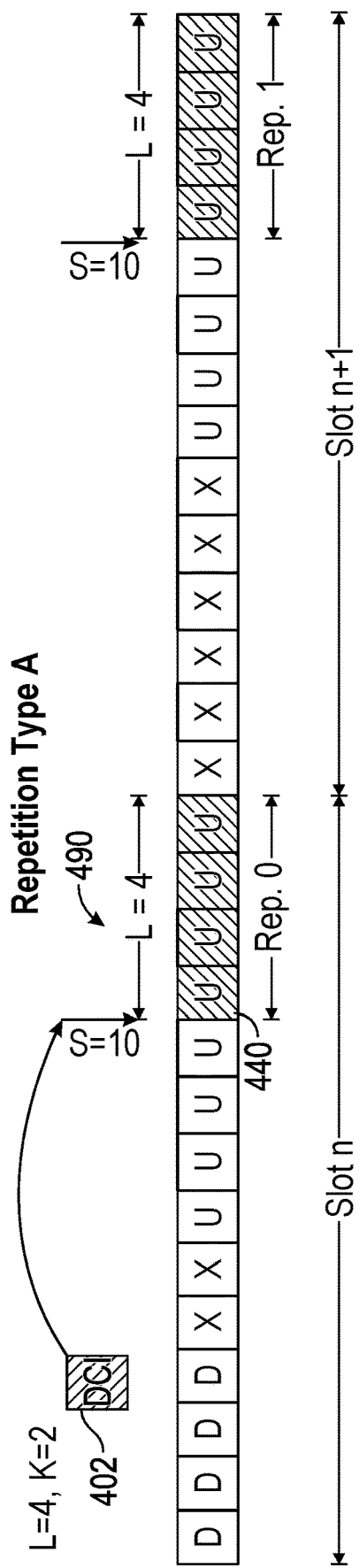
FIGS. 4A and 4B illustrate examples of physical uplink shared channel (PUSCH) repetition.

FIG. 4A illustrates an example of PUSCH repetition type-A. The symbols shown in FIG. 4A may be either configured for downlink (labeled "D"), configured for uplink (labeled "U"), or configured as a special or flexible symbol (labeled "X") which can be either designated as downlink or uplink. In some cases, a BS may indicate a number of repetitions K to a UE to be applied for PUSCH. If the number of repetitions K is greater than 1, the same start and length indicator (indicated by a start and length indicator value (SLIV)) may be applied across K consecutive slots. SLIV indicates the start symbol and length of PUSCH. For example, DCI 402 may indicate SLIV for PUSCH transmission 490, such as a start symbol 440 (e.g., S=10) with a length L of 4 symbols, as shown in FIG. 4A. As shown, the PUSCH may be transmitted based on the same SLIV in each of the K consecutive slots. For example, repetition 0 of a PUSCH TB may be transmitted in a segment of slot n and repetition 1 of the PUSCH TB may be transmitted in a segment of slot n+1, as shown. As used herein, a segment generally refers to a group of consecutive uplink configured symbols or a group of consecutive downlink configured symbols, as shown in FIG. 4A and FIG. 4B.

Figure 4B:
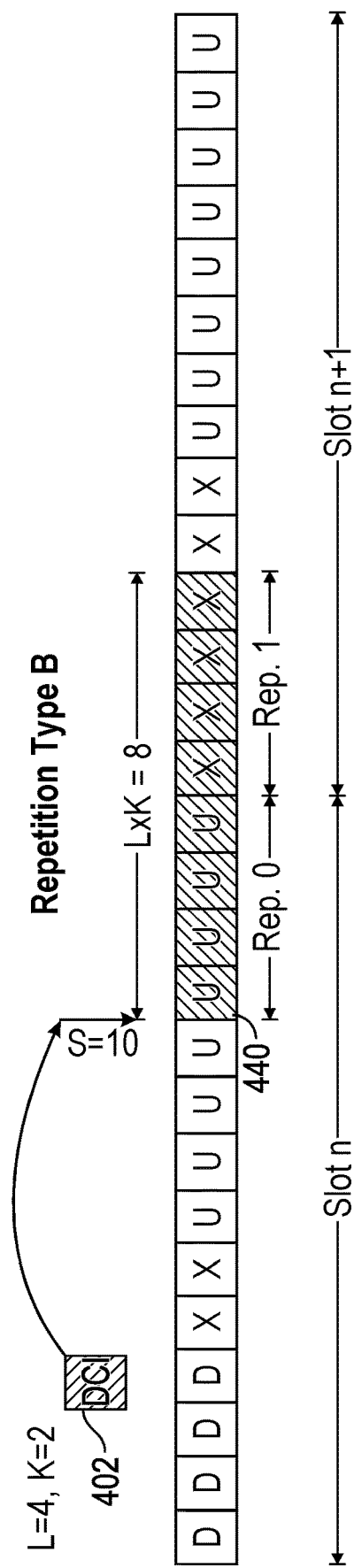

FIG. 4B illustrates an example of PUSCH repetition type-B. The symbols shown in FIG. 4B may be either configured for downlink (labeled "D"), configured for uplink (labeled "U"), or configured as a special or flexible symbol (labeled "X") which can be either designated as downlink or uplink. As shown, the repetitions of a PUSCH TB may be within or across slots. For example, the PUSCH may cross a slot boundary, such as the boundary between slot n and n+1 shown in FIG. 4B.

In some aspects, dynamic indication of a number of repetitions may be implemented. That is, DCI 402 may indicate SLIV for the PUSCH TB repetitions. For example, a start at symbol (S=10) may be indicated with K=2 repetitions, as shown. More generally, DCI 402 may indicate that K nominal repetitions, each with nominal length L, may be sent back-to-back starting from symbol 440 (S=10), where S and L are given by SLIV. Accordingly, as shown in FIG. 4B, repetition 0 may be transmitted in a segment of slot n and repetition 1 may be transmitted in a segment of slot n+1, where the segments are contiguous. Moreover, while FIGS. 4A and 4B have illustrated an example uplink/downlink (U/D) symbol interaction and SLIV configuration to facilitate understanding, any U/D symbol interaction or SLIV configuration may be used.

Figure 5:
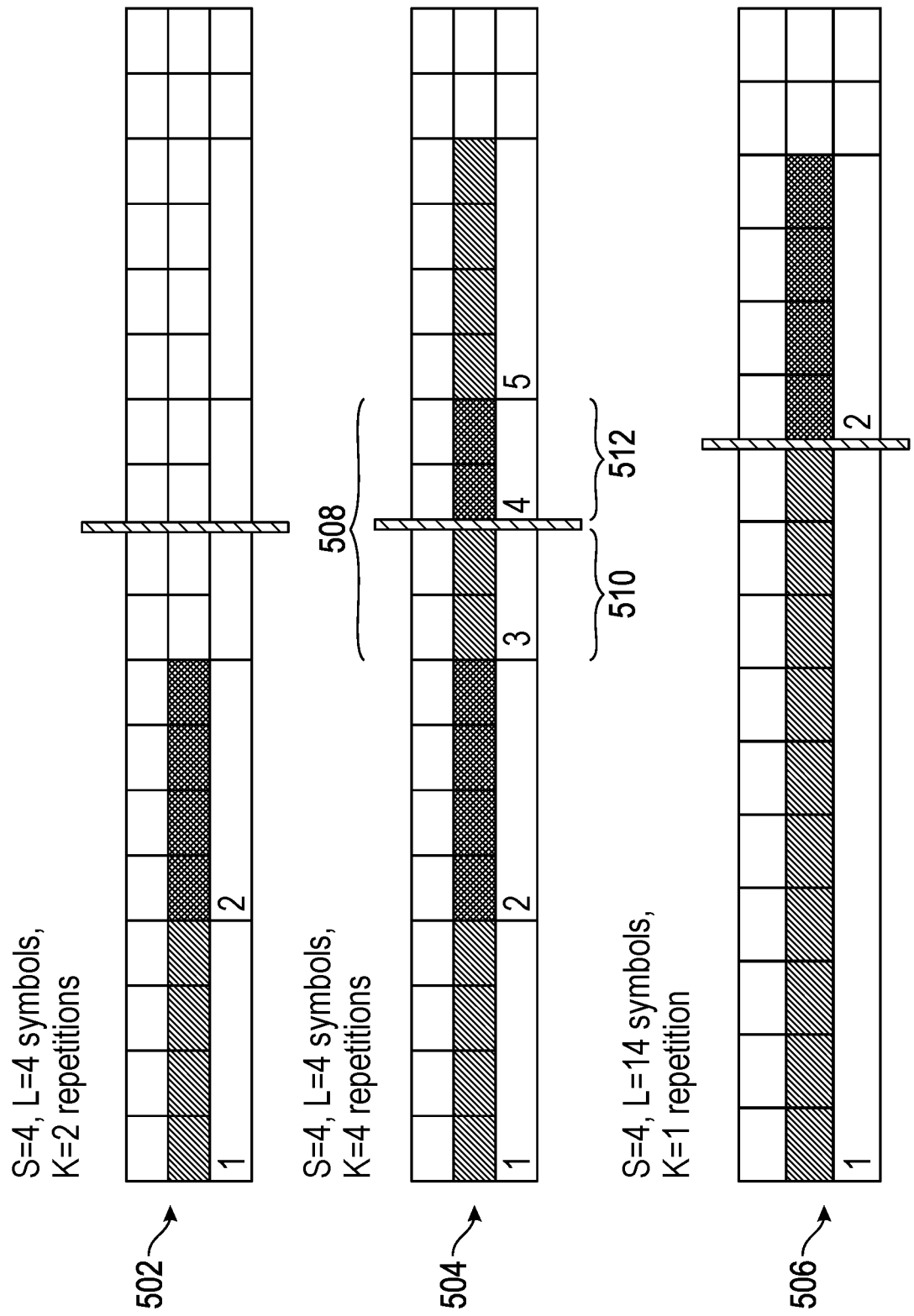
FIG. 5 illustrates different PUSCH repetition configurations.

FIG. 5 illustrates different PUSCH repetition type-B configurations. For example, a first PUSCH repetition type-B configuration is illustrated at 502. As shown, in the first PUSCH repetition type-B configuration, two nominal PUSCH repetitions (K=2) each of a length of four symbols (L=4) may be transmitted back-to-back within one slot. In some cases, a transport block size (TBS) may be based on the nominal length size L. A second PUSCH repetition type-B configuration is illustrated at 504. The second PUSCH repetition type-B configuration involves four nominal PUSCH repetitions (K=4) transmitted across two slots, each nominal PUSCH repetition having a length of four symbols (L=4). As shown, a third PUSCH repetition 508 may cross a boundary between the two slots. When this occurs, the third PUSCH repetition 508 is split into two "actual" repetitions, namely a first actual PUSCH repetition 510 and a second actual PUSCH repetition 512. Finally, a third PUSCH repetition type-B configuration is illustrated at 506. The third PUSCH repetition type-B configuration illustrates the case when only one nominal PUSCH repetition is configured (K=1) but having a length of 14 symbols, resulting in the one nominal PUSCH repetition spanning across two slots.

Because PUSCH repetition type-B repetitions occur back-to-back, there may be instances in which a particular nominal PUSCH repetition may be segmented into two actual PUSCH repetitions. Such segmentation may occur, for example, around slot borders, semi-static downlink (DL) symbols, and possibly around symbols indicated by a parameter known as InvalidSymbolPattern.

Figure 6:
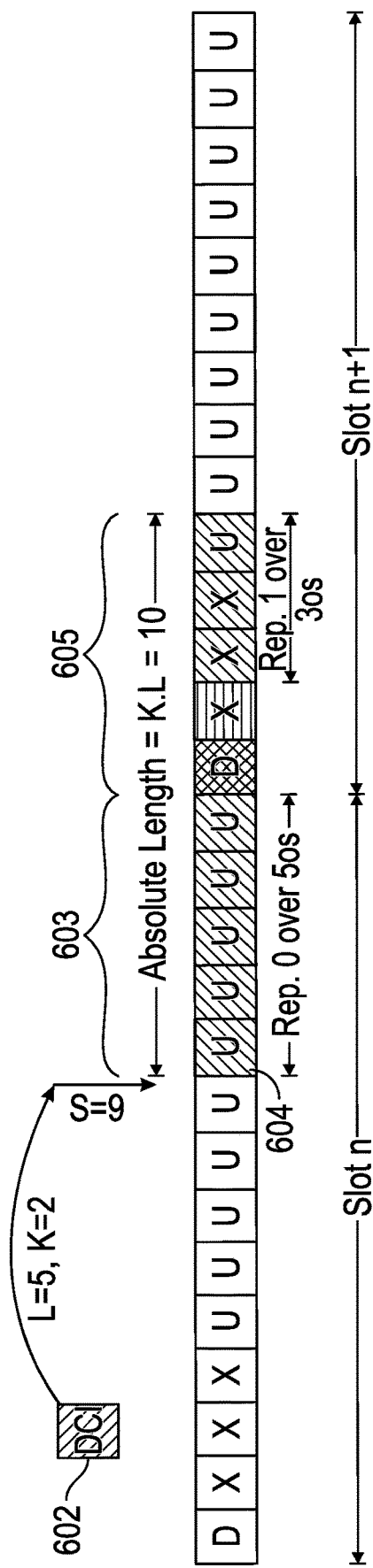
FIG. 6 illustrates an example of segmentation associated with PUSCH repetitions.

FIG. 6 illustrates an example of segmentation around semi-static DL symbols and invalid symbols. For example, as illustrated, DCI 602 may indicate SLIV for PUSCH TB repetitions. More specifically, DCI 602 may indicate that K=2 nominal repetitions, each with nominal length L=5, may be sent back-to-back starting from symbol 604 (e.g., S=9), where S and L are given by SLIV. Accordingly, as shown, a first PUSCH TB repetition 603 (e.g., repetition 0) starts at symbol 604 in slot n and extends across the last five uplink symbols of slot n. Normally, a second PUSCH TB repetition 605 would start immediately after the first PUSCH TB repetition. However, in the example shown in FIG. 6, a downlink symbol 606 (labeled "D") in slot n+1 occurs immediately the last uplink symbol of the first PUSCH TB repetition as well as a flexible symbol 608 (labeled "X"), which may be indicated as an invalid symbol within the parameter InvalidSymbolPattern. Because the downlink symbol 606 and invalid flexible symbol 608 in slot n+1 occur immediately after the first PUSCH TB repetition in slot n, the second PUSCH TB repetition 605 may be segmented. As a result, the first two symbols of the second PUSCH TB repetition 605 occurring in downlink symbol 606 and invalid flexible symbol 608 may be dropped. The remaining three symbols of the second PUSCH TB repetition 605 may then be transmitted in the three uplink symbols following invalid flexible symbol 608.

In some cases, a frequency hopping scheme may be used when transmitting PUSCH type-B repetitions. In some cases, this frequency hopping scheme may include inter-slot frequency hopping or inter-nominal frequency hopping. In some cases, the frequency hopping scheme may be indicated to a UE by a base station using the radio resource control (RRC) parameter frequencyHopping-ForDCIFormat0_1 or by frequencyHopping-ForDCIFormat0_2, which may be configured in pusch-Config for scheduling/activation by DCI format 0_1 and DCI 0_2, respectively. In some cases, for Type 1 CG, the frequency hopping scheme may be given by the parameter frequencyHopping-PUSCHRepTypeB provided in configuredGrantConfig. In some case, unlike 3rd Generation Global Partnership (3GPP) Release 15 or type-A PUSCH repetition, for PUSCH type-B repetition, type2 CG scheme follows the frequency hopping scheme associated with activation DCI.

When using inter-nominal frequency hopping, a UE may transmit a first PUSCH repetition in a slot using a first set of frequency hopping resources. In some cases, the first set of frequency hopping resources may be defined based on a first starting resource block (RB) indicated in scheduling information, such as DCI. After transmitting the first PUSCH repetition, a frequency hop may occur and the UE may transmit a second PUSCH repetition (in a symbol immediately following a last symbol of the first PUSCH repetition) using a second set of frequency hopping resources different from the first set of frequency hopping resources used for transmitting the first PUSCH transmission. In some cases, the second set of frequency hopping resources may be defined based on a second starting RB different from the first starting RB.

Figure 7:
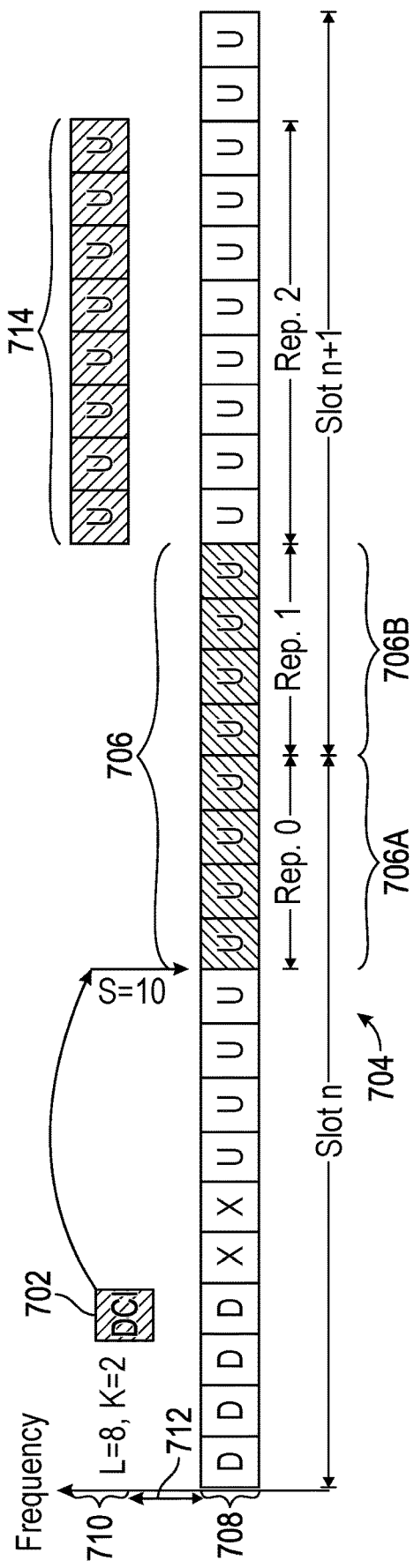
FIG. 7 provides an example of inter-nominal frequency hopping when transmitting PUSCH repetitions.

FIG. 7 provides an example of inter-nominal frequency hopping when transmitting PUSCH repetitions. For example, as illustrated, a UE may receive DCI 702, which may indicate SLIV for PUSCH TB repetitions. More specifically, DCI 702 may indicate that K=2 nominal repetitions, each with nominal length L=8, may be sent back-to-back starting from symbol 704 (e.g., S=10) in slot n, where S and L are given by SLIV. Accordingly, as shown, transmission of a first nominal PUSCH TB repetition 706 by the UE starts at symbol 704 in slot n and extends across a slot boundary between slot n and slot n+1. As a result, the first nominal PUSCH TB repetition 706 may be split into a first actual repetition 706A (e.g., repetition 0) and a second actual repetition 706B (e.g., repetition 1). As shown the first nominal PUSCH TB repetition 706 may be transmitted using a first set of frequency hopping resources, which may be defined based on a first starting RB indicated in the DCI 702.

After transmission of the first nominal PUSCH TB repetition 706, a frequency hop 712 occurs. As a result of the frequency hop 712, the UE transmits a second nominal PUSCH TB transmission 714 (e.g., repetition 2) using a second set of frequency hopping resources 710, which may be defined by a second starting RB indicated in the DCI 702. In some cases, the second starting RB may be indicated using a frequency offset that may be applied to the first starting RB. As shown, the second nominal PUSCH TB transmission 714 begins in slot n+1 in the next symbol after the last symbol of the first nominal PUSCH TB repetition 706.

When transmitting PUSCH repetitions, these PUSCH repetitions must be transmitted within uplink resources (e.g., an uplink subband) of a slot. In legacy systems, this was not an issue since frequency hopping resources and symbols within a slot allocated for transmission of PUSCH repetitions included only uplink frequency resources (e.g., only an uplink subband). However, in emerging systems, there may be cases in which subband full duplex (SBFD) is supported by a base station within certain slots. SBFD may result, in some cases, in symbols of a slot, in which PUSCH repetitions are to be transmitted, having frequency resources (e.g., uplink subbands) allocated for uplink transmissions as well as frequency resources (e.g., downlink subbands) allocated for downlink transmissions. In other words, there may be cases in which frequency resources in a slot may be split among frequency resources for uplink transmissions and frequency resources for downlink transmissions.

Figure 8:
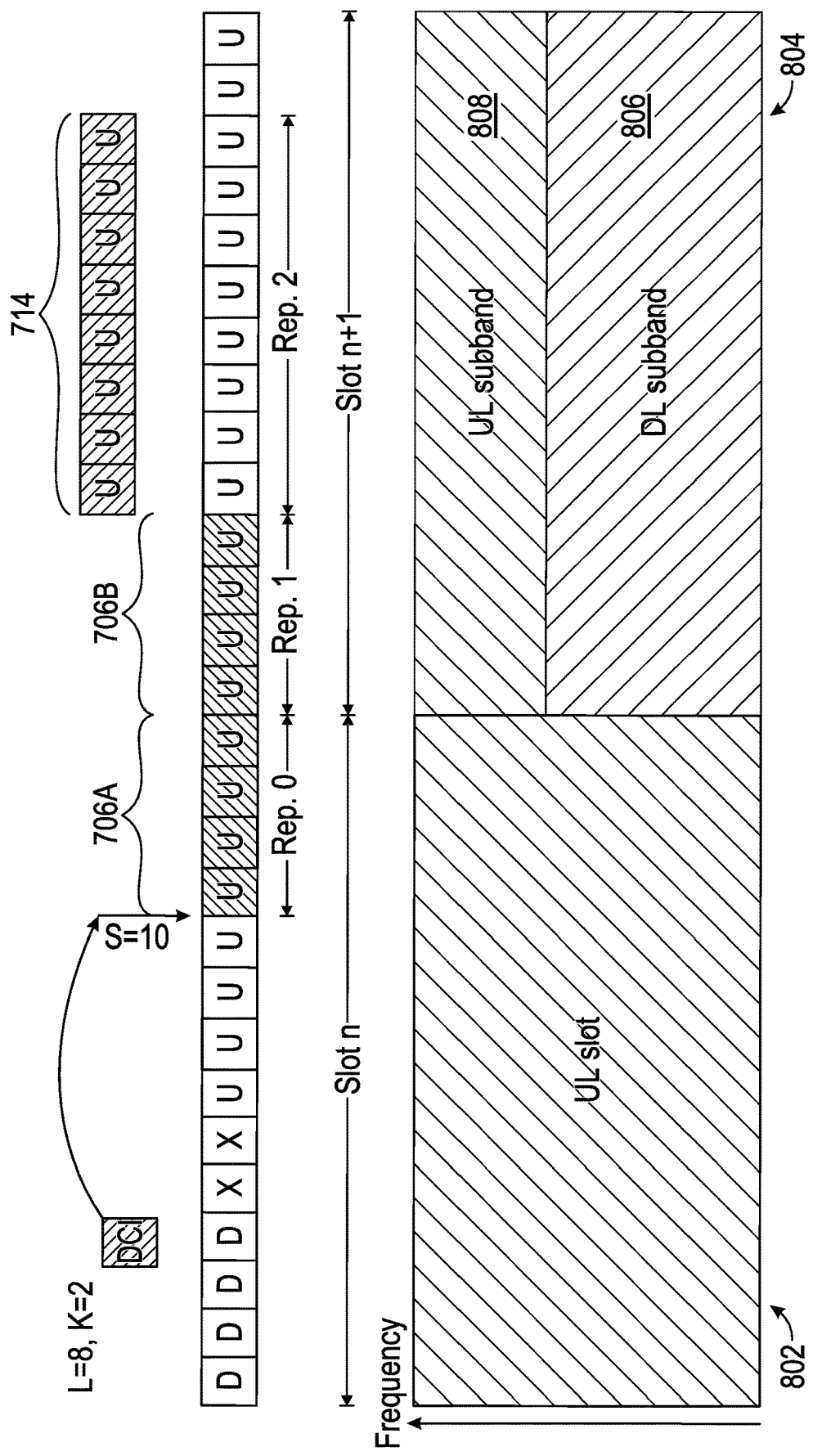
FIG. 8 illustrates an example of an uplink slot and a subband full duplex slot in relation to the inter-nominal frequency hopping.

FIG. 8 illustrates an example of an uplink slot and an SBFD slot in relation to the inter-nominal frequency hopping example of FIG. 7. For example, as shown, slot n in which the first actual repetition 706A is to be transmitted comprises an uplink slot 802. As such, frequency resources within the symbols of slot n (e.g., uplink slot 802) for transmission of the first actual repetition 706A comprise frequency resources only allocated for uplink. In contrast, however, slot n+1 in which the second actual repetition 706B and the second nominal PUSCH TB repetition 714 are to be transmitted comprises an SBFD slot 804. As can be seen, the SBFD slot 804 includes a downlink subband 806 including frequency resources allocated for downlink transmissions and an uplink subband 808 including frequency resources allocated for uplink transmissions.

SBFD slots may cause issues when transmitting PUSCH repetitions as there may be cases in which frequency hopping resources over which the PUSCH repetitions are scheduled to be transmitted may not coincide with the frequency resources allocated for the uplink transmissions (e.g., in the uplink subband 808) within the SBFD slots. In such cases, if a UE were to proceed ahead with transmitting the PUSCH repetitions via the frequency hopping resources that do not coincide with the frequency resources for uplink transmissions in an SBFD slot, these PUSCH repetition transmissions may interfere with downlink transmissions, potentially causing both these PUSCH repetitions and interfered downlink transmissions to have to be retransmitted, resulting in wasted time and frequency resources within a wireless network as well as wasted power resources at the devices performing the retransmissions. In other cases, the UE may decide to drop the PUSCH repetition that does not coincide with the frequency resources for uplink transmissions in the SBFD slot, which may reduce data transmission coverage of data transmitted on the PUSCH and can lead to increase latency and additional retransmissions if the PUSCH data is not received correctly due to the dropped PUSCH repetition.

Moreover, these issues with SBFD slots may be exacerbated when an inter-nominal frequency hopping scheme is used for transmitting PUSCH repetitions as the frequency hopping resources allocated for these PUSCH repetition transmissions may change from PUSCH repetition to PUSCH repetition (in some cases within one slot). For example, in some cases, frequency hopping resources for transmitting a first PUSCH repetition in an SBFD slot may coincide with the uplink subband of the SBFT while frequency hopping resources for transmitting a second PUSCH repetition in the SBFD slot may not coincide with the uplink subband of the SBFT slot. In such cases, it is uncertain whether the UE should drop transmission of the second PUSCH repetition in the SBFD or delay the second PUSCH repetition to a subsequent available slot. Moreover, given that the second PUSCH repetition in the SBFD slot will be dropped or delayed (e.g., due to the frequency resources for the second PUSCH repetition not coinciding with the uplink subband of the SBFD slot), it is uncertain whether the UE may still proceed with transmitting the first PUSCH repetition in the SBFD slot or whether the UE should delay transmission of the first PUSCH repetition to a subsequent available slot in which both the first PUSCH repetition and second PUSCH repetition may be transmitted.

Therefore, aspects of the present disclosure provide techniques for helping to resolve the issues and uncertainties described above when using an inter-nominal frequency hopping scheme to transmit PUSCH repetitions in full duplex slots (e.g., SBFD slots). For example, in some cases, these techniques may include, when scheduled to transmit PUSCH repetitions according to a frequency hopping scheme, a UE may transmit PUSCH repetitions in one or more slots according to a slot availability rule that takes into account whether frequency hopping resources within the one or more slots are available for transmission of the plurality of uplink data channel repetitions. In some cases, the slot availability rule may be used by the UE when determining which slot to transmit the PUSCH repetitions in.

Example Operations of Entities in a Communication Network

Figure 9:
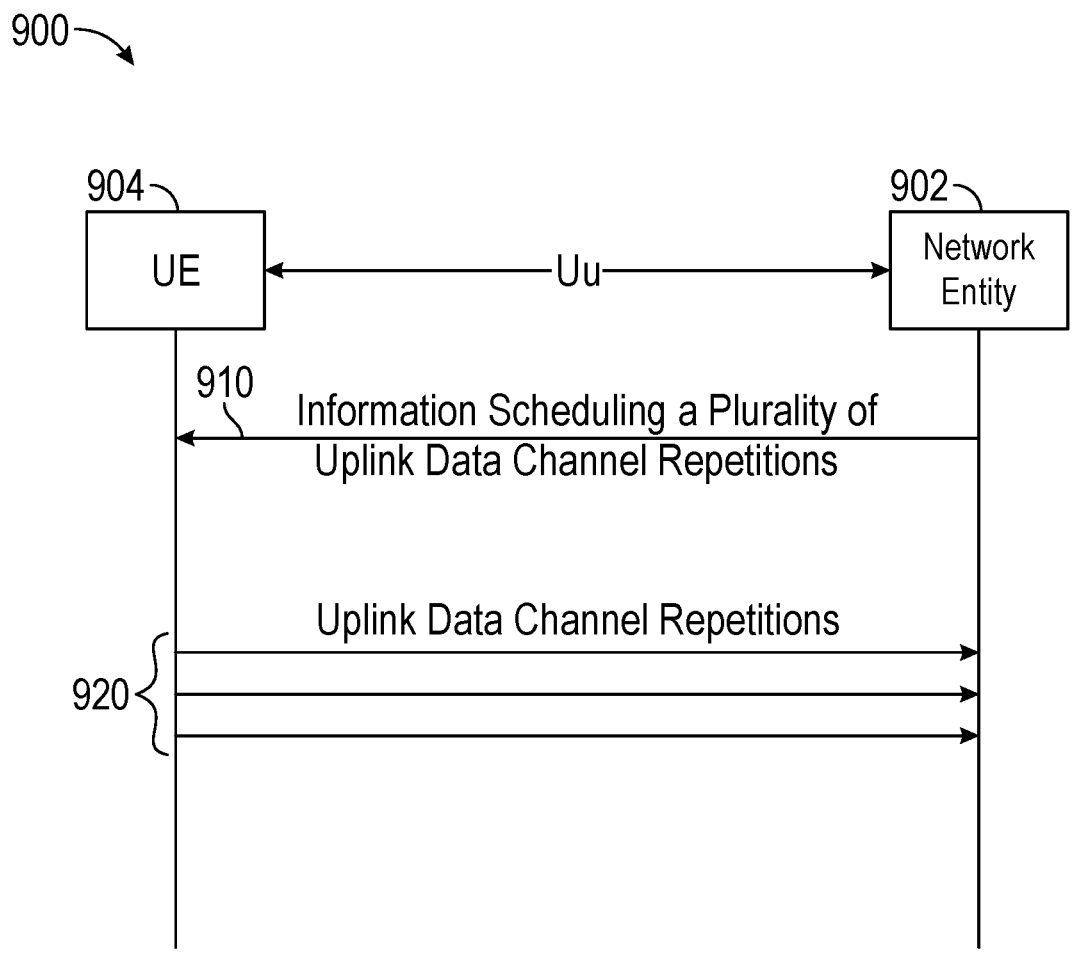
FIG. 9 depicts a process flow for communication in a network between a user equipment and a network entity.

FIG. 9 depicts a process flow of operations 900 for communication in a network between a network entity 902 and a user equipment (UE) 904. In some aspects, the network entity 902 may be an example of the BS 102 depicted and described with respect to FIGS. 1 and 2 or a disaggregated BS described with respect to FIG. 18. Similarly, the UE 904 may be an example of UE 104 depicted and described with respect to FIGS. 1 and 2. However, in other aspects, UE 104 may be another type of wireless communication device and BS 102 may be another type of network entity or network node, such as those described herein.

As shown, operations 900 begin at 910 with the UE 904 receiving information from network entity 902 scheduling transmission of a plurality of uplink data channel repetitions in one or more slots according to a frequency hopping scheme. The frequency hopping scheme may configure frequency hops between transmissions of repetitions of the plurality of uplink data channel repetitions.

In some cases, the uplink data channel repetitions may comprise PUSCH type-B repetitions and may be scheduled to occur back-to-back. In some cases, the information received from the network entity 902 may comprise, for example, RRC signaling or a DCI that includes one or more parameters for transmitting the plurality of uplink data channel repetitions, such as an SLIV, a number of repetitions, one or more starting resource blocks (RBs), one or more frequency offsets, and the like. In some cases, the one or more starting RBs may define a set of frequencies over which a particular repetition should be transmitted over. As noted above, a frequency hop may occur between repetitions. As such, in some cases, when transmitting another repetition, the one or more of the frequency offsets may be applied to the one or more starting RBs to determine another set of frequency hopping resources over which this other repetition is to be transmitted. In other cases, a different starting RB may be indicated for this other repetitions that defines the other set of frequency hopping resources.

Thereafter, as illustrated at 920, the UE 904 transmits the plurality of uplink data channel repetitions in the one or more slots. In some cases, the one or more slots may comprise at least a first slot including an uplink subband and a downlink subband, such as an SBFD slot (e.g., SBFD slot 804 illustrated in FIG. 8).

In some cases, the information received at 910 by the UE 904 schedules at least a portion of a first repetition of the plurality of uplink data channel repetitions via a first set of frequency hopping resources in the first slot of the one or more slots. The information may also schedule a portion of a second repetition of the plurality of uplink data channel repetitions via a second set of frequency hopping resources in the first slot. Because the first slot includes both an uplink subband and downlink subband, the UE 904 may need consider whether the first slot is available for transmitting the portion of the first repetition and/or the portion of the second repetition. Whether the first slot is available may depend on a slot availability rule. For example, in some cases, transmitting the plurality of uplink data channel repetitions in the one or more slots at 920 in FIG. 9 may comprise transmitting the plurality of uplink data channel repetitions according to a slot availability rule that takes into account whether frequency hopping resources within the one or more slots are available for transmission of the plurality of uplink data channel repetitions.

In some cases, the slot availability rule may take into account whether frequency hopping resources within the one or more slots are available for transmission of the plurality of uplink data channel repetitions. For example, in certain wireless standards releases, only time resources were considered when determining whether a particular slot was available for transmitting PUSCH repetitions. However, because some slots may include symbols associated with both downlink resources and uplink resources, whether a slot is available for transmission of PUSCH repetitions also needs to take into account whether frequency hopping resources within the slot are available for transmission of the plurality of uplink data channel repetitions.

Figure 10A:
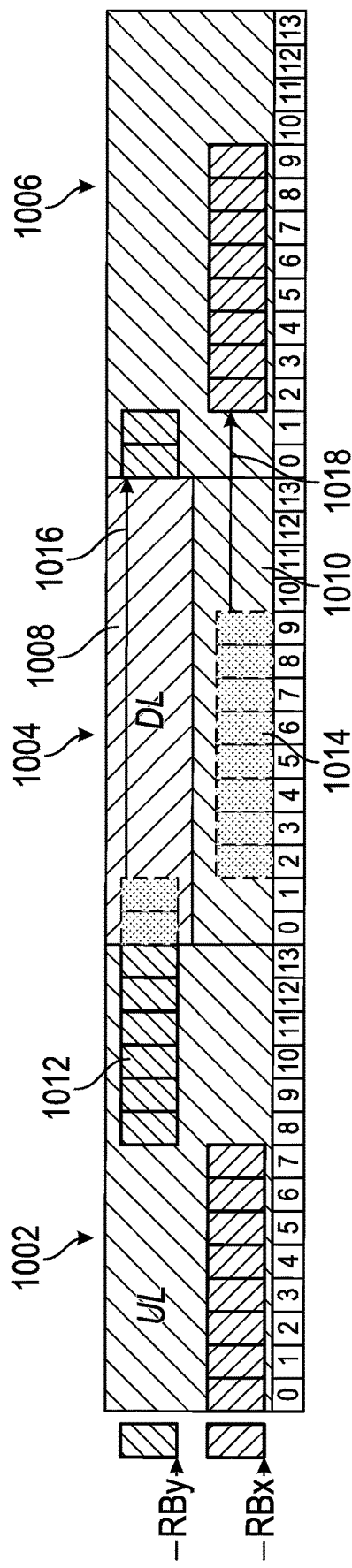
FIGS. 10A and 10B illustrate an example of a slot availability rule.
Figure 10B:
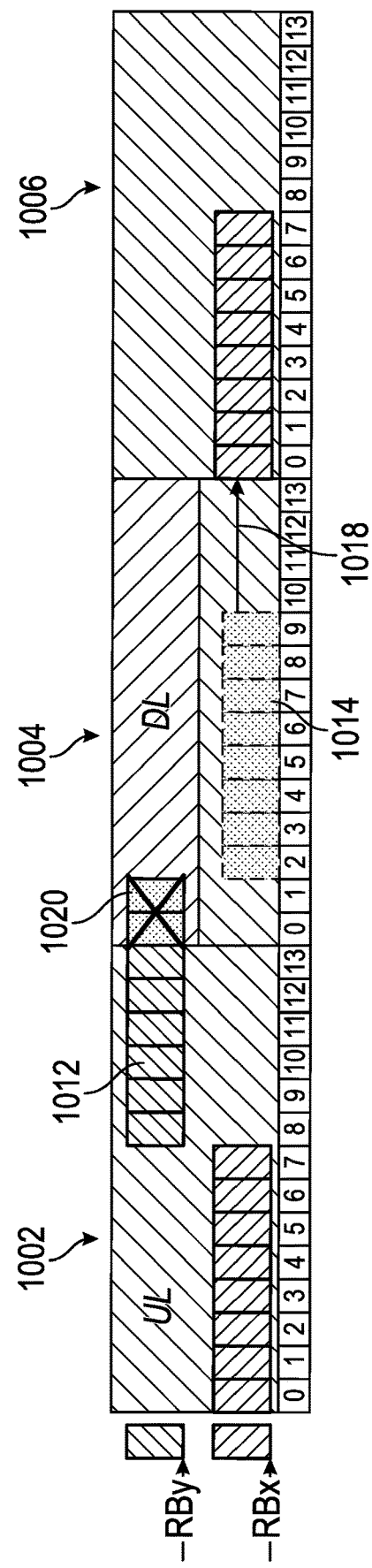

In some cases, the slot availability rule indicates that the first slot is available for transmission of at least the portion of the first repetition and the portion of the second repetition when the first set of frequency hopping resources associated with the portion of the first repetition and the portion of the second set of frequency hopping resources associated with the second repetition are each included within the uplink subband of the first slot. More generally, when there are more than two repetitions in a slot, the slot availability rule indicates the slot is available when the frequency hopping resources for all of the repetitions are available (e.g., the frequency hopping resources associated with each repetition coincide with the uplink subband of the slot). An example of this slot availability rule is illustrated in FIGS. 10A and 10B.

According to aspects, when the first set of frequency hopping resources associated with the portion of the first repetition and the portion of the second set of frequency hopping resources associated with the second repetition are each included within the uplink subband of the first slot, transmitting the plurality of uplink data channel repetitions at 920 in FIG. 9 may include transmitting the portion of the first repetition via the first set of frequency hopping resources in the first slot and the portion of the second repetition via the second set of frequency hopping resources in the first slot.

In other cases, when either the first set of frequency hopping resources associated with the portion of the first repetition or the portion of the second set of frequency hopping resources associated with the second repetition are not included within the uplink subband of the first slot, the slot availability rule may indicate that the first slot may not be available for transmitting either the portion of the first repetition or the portion of the second repetition. In such cases, transmitting the plurality of uplink data channel repetitions at 920 in FIG. 9 may include the UE deciding to drop any portion of a repetition occurring within the first slot or may delay these portions for transmission in a subsequent available slot, as explained in greater detail below.

In some cases, the slot availability rule indicates that the first slot is available for transmission when at least one of the first set of frequency hopping resources associated with the portion of the first repetition or the portion of the second set of frequency hopping resources associated with the second repetition are included within the uplink subband of the first slot. More generally, when there are more than two repetitions in a slot, the slot availability rule indicates the slot is available when the frequency hopping resources for any of the repetitions are available (e.g., the frequency hopping resources associated with any repetition coincide with the uplink subband of the slot). An example of this slot availability rule is illustrated in FIGS. 11A and 11B.

FIGS. 10A and 10B illustrate an example of the slot availability rule in which a slot is available when the frequency hopping resources for each repetition in the slot are available (e.g., coincide with an uplink subband of the slot).

For example, FIG. 10A illustrates a plurality of slots, such as slot 1002, slot 1004, and slot 1006, which may be used for transmitting one or more PUSCH repetitions. As shown, the slot 1002 and slot 1006 are uplink slots, including only uplink resources for transmitting uplink transmissions, such as PUSCH repetitions. In other words, the slot 1002 and slot 1006 only include an uplink subband. Conversely, the slot 1004 is an SBFD slot including both a downlink subband 1008 that may be used by the network entity 902 for transmitting DL transmissions and an uplink subband 1010 that may be used by the UE 904 for transmitting UL transmissions, such as PUSCH repetitions.

As shown in FIG. 10A and as noted above, the UE 904 may be scheduled (e.g., via the information received at 910 by the UE 904) to transmit at least a portion of a first repetition 1012 in the slot 1004 and a portion of a second repetition 1014. The first repetition 1012 and second repetition 1014 may be PUSCH type-B repetitions and may be scheduled back-to-back. Further, as can be seen, the first repetition 1012 begins in slot 1002, extending across a boundary between the slot 1002 and the slot 1004. As a result, a portion of the first repetition 1012 (e.g., two symbols) is scheduled to occur within the slot 1004. Further, as shown, the second repetition 1014 is wholly contained within slot 1004.

As shown, the first repetition 1012 is scheduled to be transmitted via a first set of frequency hopping resources starting at $RB_y$ and the second repetition 1014 is scheduled to be transmitted via a second set of resources starting at $RB_x$. As can be seen, starting $RB_y$ associated with the first repetition 1012 is different from starting $RB_x$ associated with the second repetition 1014, resulting in a frequency hop between transmission of the portion of the first repetition 1012 via the first set of frequency hopping resources and transmission of the portion of the second repetition 1014 via the second set of frequency hopping resources.

Due to the different starting RBs, the second set of frequency hopping resources associated with the portion of the second repetition 1014 coincide with the uplink subband 1010 of the slot 1004 while the first set of frequency hopping resources associated with the portion of the first repetition 1012 coincide with the downlink subband 1008 of the slot 1004. As a result, the first set of frequency hopping resources associated with the portion of the first repetition 1012 may not be available for transmitting the portion of the first repetition 1012 while the second set of frequency hopping resources associated with the portion of the first repetition 1012 are be available for transmitting the portion of the second repetition 1014.

In such cases, the slot availability rule may indicate that the slot 1004 is not available for transmitting either of the portion of the first repetition 1012 (e.g., indicated by the dashed lines around the portion of the first repetition 1012 occurring in slot 1004) or the portion of the second repetition 1014 (e.g., indicated by the dashed lines around the portion of the second repetition 1014 occurring in slot 1004). As a result of the slot 1004 not being available, the UE 904 may instead decide to drop or delay transmission of at least one of the portion of the first repetition 1012 or the portion of the second repetition 1014.

For example, as can be seen in FIG. 10A, rather than drop transmission of the portion of the first repetition 1012 and the portion of the second repetition 1014, the UE 904 delays the transmission of the portion of the first repetition 1012 and the portion of the second repetition 1014 to a subsequent available slot (e.g., slot 1006), as shown at 1016 and 1018, respectively. In other words, the UE 904 may delay transmission of the portion of the first repetition and the portion of the second repetition. Thereafter, the UE 904 may transmit (e.g., at 920 in FIG. 9) the portion of the first repetition and the portion of the second repetition in a subsequent available slot in which the first set of frequency hopping resources associated with the portion of the first repetition and the portion of the second set of frequency hopping resources associated with the second repetition are each included within an uplink subband of the subsequent slot, such as in the slot 1006 in FIG. 10A.

In other cases, the UE 904 may drop at least one of the portion of the first repetition 1012 or the portion of the second repetition 1014 in the slot 1004. For example, as can be seen in FIG. 10B, the UE 904 drops transmission of the portion of the first repetition 1012 in slot 1004 as shown at 1020. In the context of this disclosure, dropping a transmission may mean that the UE 904 does not transmit the portion of the dropped repetition in any slot, including the slot 1004 or any other slot.

In some cases, UE 904 may be configured to delay transmission of the portion of the first repetition 1012 and the portion of the second repetition 1014 or drop transmission of the portion of the first repetition 1012 and the portion of the second repetition 1014 based on a fixed rule or signaling received from the network entity 902. For example, in some case, the fixed rule may indicate to the UE 904 drop transmission of any portion of a repetition, included within a non-available slot, that is equal to or below a threshold number of symbols. Otherwise, the fixed rule may indicate to the UE 904 should delay transmission of a repetition to a subsequent slot if the portion of that repetition (e.g., not included within the uplink subband of a slot) is greater than the threshold number of symbols. In some cases, the fixed rule may indicate to always drop the portion of the repetition occurring within the non-available slot or may indicate to always delay the portion of the repetition occurring within the non-available slot to a subsequent available slot.

In some cases, the threshold number of symbols may be a static threshold or may depend or change based on the number of symbols configured for repetitions. For example, in some cases, the threshold number of symbols could be statically set at four symbols (any number of symbols could be chosen for the threshold number of symbols). In other cases, the threshold number of symbols may be set to be a number of symbols that is less than half of a length of a repetition or some other number of symbols based on the length of the repetition. For example, when the number of symbols of a repetitions within a non-available slot (e.g., slot 1004) is above half of the length of the repetition, a portion of the repetition within the non-available slot may be delayed to a subsequent slot whereas, when the number of symbols of a repetition within the non-available slot is equal to or below half of the length of the repetition, the portion of the repetition within the non-available slot may simply be dropped (and not transmitted in a subsequent slot).

For example, assuming the threshold number of symbols is four symbols, as shown in FIG. 10B, the UE 904 may drop at 1020 the portion of the first repetition 1012 occurring within (non-available) slot 1004 since the number of symbols of the portion of the first repetition 1012 occurring within slot 1004 (e.g., two symbols) is less than the threshold number of four symbols. Conversely, the UE 904 may delay, as shown at 1018, the portion of the second repetition 1014 occurring within (non-available) slot 1004 to a subsequent slot, such as slot 1006, since the portion of the second repetition 1014 is greater than four symbols (e.g., the length of the portion of the second repetition 1014 in slot 1004 is eight symbols). In some cases, when the portion of the second repetition 1014 is delayed to the subsequent available slot (e.g., slot 1006) while the portion of the first repetition 1012 is dropped, the portion of the second repetition 1014 may begin at the start of the subsequent slot, as shown in FIG. 10B.

As noted above, FIGS. 11A and 11B illustrate an example of the slot availability rule in which a slot is available when the frequency hopping resources for any repetition in the slot are available (e.g., coincide with an uplink subband of the slot).

For example, FIG. 11A illustrates a plurality of slots, such as slot 1102, slot 1104, and slot 1106, which may be used for transmitting one or more PUSCH repetitions. As shown, the slot 1102 and slot 1106 are uplink slots, including only uplink resources for transmitting uplink transmissions, such as PUSCH repetitions. In other words, the slot 1102 and slot 1106 only include an uplink subband. Conversely, the slot 1104 is an SBFD slot including both a DL subband 1108 that may be used by the network entity 902 for transmitting DL transmissions and an UL subband 1110 that may be used by the UE 904 for transmitting UL transmissions, such as PUSCH repetitions.

As shown in FIG. 11A and as noted above, the UE 904 may be scheduled (e.g., via the information received at 910 by the UE 904) to transmit at least a portion of a first repetition 1112 in the slot 1104, a portion of a second repetition 1114 in the slot 1104, and a portion of a third repetition 1116 in the slot 1104. The first repetition 1112, the second repetition 1114, and the third repetition 1116 may be PUSCH type-B repetitions and may be scheduled back-to-back. Further, as can be seen, the first repetition 1112 begins in slot 1102, extending across a boundary between the slot 1102 and the slot 1104. As a result, a portion of the first repetition 1112 (e.g., two symbols) is scheduled to occur within the slot 1104. Likewise, the third repetition 1116 begins in slot 1102, extending across a boundary between the slot 1104 and the slot 1106. As a result, a portion of the third repetition 1116 (e.g., four symbols) is scheduled to occur within the slot 1104. Conversely, the second repetition 1114 is wholly contained within slot 1104.

As shown, the first repetition 1112 and third repetition 1116 are scheduled to be transmitted via a first set of frequency hopping resources starting at $RB_y$ and the second repetition 1114 is scheduled to be transmitted via a second set of resources starting at $RB_x$. As can be seen, starting $RB_y$ associated with the first repetition 1112 and third repetition 1116 is different from starting $RB_x$ associated with the second repetition 1114, resulting in a frequency hop between transmission of the portion of the second repetition 1114 via the second set of frequency hopping resources and transmission of the portion of the first repetition 1112 and the portion of the third repetition 1116 via the first set of frequency hopping resources.

Due to the different starting RBs, the second set of frequency hopping resources associated with the portion of the second repetition 1114 coincide with the UL subband 1110 of the slot 1104 while the first set of frequency hopping resources associated with the portion of the first repetition 1112 and the portion of the third repetition 1116 coincide with the DL subband 1108 of the slot 1104. As a result, the first set of frequency hopping resources associated with the portion of the first repetition 1112 and the portion of the third repetition 1116 may not be available for transmitting the portion of the first repetition 1112 or the portion of the third repetition 1116 while the second set of frequency hopping resources associated with the portion of the first repetition 1112 are be available for transmitting the portion of the second repetition 1114.

In such cases, while slot 1104 may not be available for transmitting the portion of the first repetition 1112 or the portion of the third repetition 1116, the slot availability rule may indicate that the slot 1104 is available for the portion of the second repetition 1114. As a result, transmitting the plurality of uplink data channel repetitions at 920 in FIG. 9 may include dropping transmission of the portion of the first repetition 1112 and the portion of the third repetition 1116 in the slot 1104, as shown at 1118 and 1120 respectively, and transmitting the portion of the second repetition 1114 in the slot 1104 via the second set of frequency hopping resources within the UL subband 1110 of the slot 1104.

In some cases, as shown in FIG. 11A, when the portion of the first repetition 1112 is dropped from transmission in the slot 1104, transmitting the portion of the second repetition 1114 in the slot 1104 via the second set of frequency hopping resources within the UL subband 1110 of the slot 1104 may comprise transmitting the portion of the second repetition 1114 in the slot 1104 beginning in a symbol of the slot 1104 that occurs sequentially after a last symbol in which the portion of the first repetition 1112 was scheduled to be transmitted. For example, as shown, the last symbol of the portion of the first repetition 1112 was scheduled to be symbol #1 of slot 1104. As such, the UE 904 may transmit the portion of the second repetition 1114 beginning in symbol #2 of slot 1104.

In other cases, transmitting the portion of the second repetition 1114 in the slot 1104 via the second set of frequency hopping resources within the UL subband 1110 of the slot 1104 may comprise transmitting the portion of the second repetition 1114 in the slot 1104 beginning at a first symbol of the slot 1104. For example, as illustrated in FIG. 11B, rather than waiting to transmit the portion of the second repetition 1114 in the symbol #2 occurring after the last symbol #1 in which the portion of the first repetition 1112 was scheduled, the UE 904 may instead transmit the portion of the second repetition 1114 in a first symbol (e.g., symbol #0) of the slot 1104.

In some cases, an SBFD slot may not be available for transmitting a portion of a repetition due to a starting RB of this repetition defining a set of frequency hopping resources for this repetition that do wholly not coincide with an UL subband of the SBFD slot (e.g., that are at least partially within a DL subband of the SBFD slot). In such cases, rather than delaying or dropping the portion of this repetition, as described above, the UE 904 may instead use different starting RBs for the transmission of repetitions in the SBFD slot as compared to other non-SBFD slots. For example, in some cases, the UE 904 may use starting $RB_x$ and $RB_y$ for portions of repetitions transmitted within a non-SBFD slot while using starting $RB_w$ and $RB_z$ for portions of repetitions transmitted within the SBFD slot. By using the different starting RBs in the SBFD slot, the UE 904 may still be allowed to transmit repetitions within the SBFD that would otherwise not coincide with the UL subband of the SBFD slot. For example, starting $RB_w$ and $RB_z$ may ensure frequency hopping resources for any portions of repetitions do not coincide with a DL subband of the SBFD slot.

Figure 12:
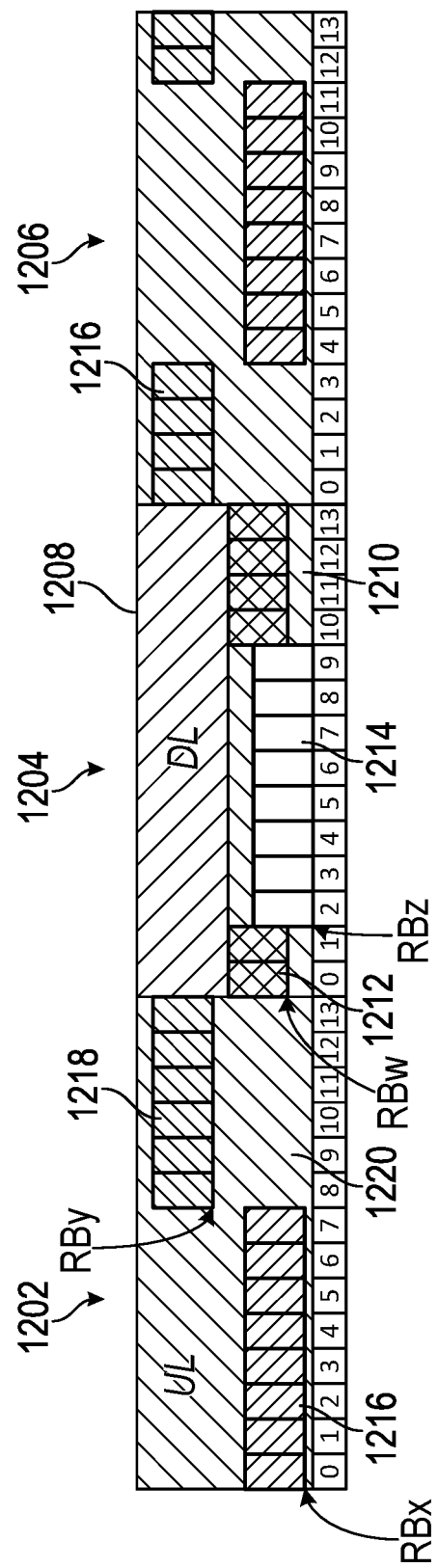
FIG. 12 illustrates an example of using different starting resource blocks in different slots when transmitting PUSCH repetitions.

FIG. 12 illustrates an example of using different starting RBs in different slots when transmitting PUSCH repetitions. For example, FIG. 12 illustrates a plurality of slots, such as slot 1202, slot 1204, and slot 1206, which may be used for transmitting one or more PUSCH repetitions. As shown, the slot 1202 and slot 1206 are non-full duplex uplink slots, including only uplink resources for transmitting uplink transmissions, such as PUSCH repetitions. In other words, the slot 1202 and slot 1206 only include an uplink subband 1220. Conversely, the slot 1204 is an SBFD slot including both a DL subband 1208 that may be used by the network entity 902 for transmitting DL transmissions and an uplink subband 1210 that may be used by the UE 904 for transmitting UL transmissions, such as PUSCH repetitions.

As shown in FIG. 12, the UE 904 may be scheduled (e.g., via the information received at 910 by the UE 904) to transmit at least a portion of a first repetition 1212 in the slot 1204 and a portion of a second repetition 1214 in the slot 1204. Additionally, as shown, the UE 904 may also be scheduled to transmit a portion of a third repetition 1216 in the slot 1202 (e.g., a non-full duplex/non-SBFD slot) and a portion of a fourth repetition 1218 in the slot 1202. As can be seen, the portion of the first repetition 1212 and the portion of the fourth repetition 1218 may be part of a larger nominal repetition but, because this larger nominal repetition is split between slot 1202 and slot 1204, this nominal repetition is split into two "actual" repetitions (i.e., portion of the first repetition 1212 and the portion of the fourth repetition 1218).

In some cases, the information received at 910 in FIG. 9 by the UE 904 may indicate a first starting RB (e.g., $RB_w$) for a first set of frequency hopping resources for transmitting the portion of the first repetition 1212 in the uplink subband 1210 of the slot 1204 and a second starting RB (e.g., $RB_z$) for a second set of frequency hopping resources for transmitting the portion of the second repetition 1214 in the uplink subband 1210 of the slot 1204. Further, in some cases, the information received at 910 in FIG. 9 by the UE 904 may indicate a third starting RB (e.g., $RB_x$) for a third set of frequency hopping resources for transmitting the portion of a third repetition 1216 in an uplink subband 1220 of the slot 1202 and a fourth starting RB (e.g., $RB_y$) for a fourth set of frequency hopping resources for transmitting the portion of a fourth repetition 1218 in the uplink subband 1220 of the slot 1202. In some cases, the first starting RB and the second starting RB are different from the third starting RB and the fourth starting RB.

Accordingly, as shown, the UE 904 may transmit (e.g., at 920 in FIG. 9) the portion of the third repetition 1216 in the slot 1202 via the third set of frequency hopping resources within the uplink subband 1220 of the slot 1202 defined by starting $RB_x$. Additionally, when transmitting (e.g., at 920 in FIG. 9) the portion of the fourth repetition 1218 in the slot 1202 via the fourth set of frequency hopping resources within the uplink subband 1220 of the slot 1202 defined by starting $RB_y$. Additionally, the UE 904 may transmit (e.g., at 920 in FIG. 9) the portion of the fourth repetition 1218 in the slot 1202 via the fourth set of frequency hopping resources within the uplink subband 1220 of the slot 1202 defined by starting $RB_y$. Additionally, the UE 904 may transmit (e.g., at 920 in FIG. 9) the portion of the first repetition 1212 in the slot 1204 via the first set of frequency hopping resources within the uplink subband 1210 of the slot 1204 defined by starting $RB_w$. Additionally, the UE 904 may transmit (e.g., at 920 in FIG. 9) the portion of the second repetition 1214 in the slot 1204 via the second set of frequency hopping resources within the uplink subband 1210 of the slot 1204 defined by starting $RB_z$.

As can be seen, while the portion of the first repetition 1212 and the portion of the fourth repetition 1218 may be part of a larger nominal PUSCH repetition, because different starting RBs are used within the slot 1202 and slot 1204, a frequency hop occurs between the portions of the larger nominal PUSCH repetitions. That is, a frequency hop occurs between transmission of the portion of the fourth repetition 1218 and transmission of the portion of the first repetition 1212 even though they are part of a larger nominal PUSCH repetition. As noted above, the reason for this frequency hop between portions of a larger nominal PUSCH repetition is so that a portion of the larger nominal PUSCH repetition (e.g., the portion of the first repetition 1212) that would normally occur within a DL subband of an SBFD slot (e.g., if the same starting RBs were used across both SBFD slots and non-SBFD slots) may still be transmitted within the SBFD slot.

In some cases, whether the UE 904 transmits at 920 in FIG. 9 a repetition of the plurality of uplink data channel repetitions in a particular slot may be based on a "hop location" (e.g., a location of frequency hopping resources defined by a starting RB) for transmitting the repetitions in that particular slot. For example, the UE 904 may transmit at 920 in FIG. 9 a repetition of the plurality of uplink data channel repetitions within the particular slot when frequency hopping resources (e.g., the hop location) within that particular slot are available for transmission of UL transmissions (e.g., within an UL subband of the particular slot). Otherwise, if the (time or frequency resources) hop location is not available within the particular slot for transmitting the repetition (e.g., the hop location is within a DL subband of the particular slot), the repetition may be dropped.

In some cases, determining the hop location may be the same between legacy non-SBFD slots (e.g., UL-only slots) and SBFD slots (e.g., UL+DL slots). In some cases, if a nominal repetitions starts in a legacy non-SBFD slot, a legacy method may be used for determining the hop location. For any nominal repetitions that starts in an SBFD slot, the hop location may be determined in different manners. For example, in some cases, frequency offsets and starting RBs for repetitions of the plurality of uplink data channel repetitions in a non-SBFD slot are the same as frequency offsets and starting RBs for repetitions of the plurality of uplink data channel repetitions in an SBFD slot. In other cases, In some cases, frequency hopping may be disallowed within SBFD slots when transmitting PUSCH repetitions. In such cases, back-to-back repetitions within SBFD slots may each use the same frequency hopping resources within an UL subband of the SBFD slot defined by the same starting RB. Accordingly, for example, transmitting the plurality of uplink data channel repetitions in the one or more slots at 920 in FIG. 9 may include transmitting at least two repetitions of the plurality of uplink data channel repetitions within an SBFD slot via a same set of frequency hopping resources within an UL subband of the SBFD slot defined by a same starting RB.

Example Operations of a User Equipment

Figure 14:
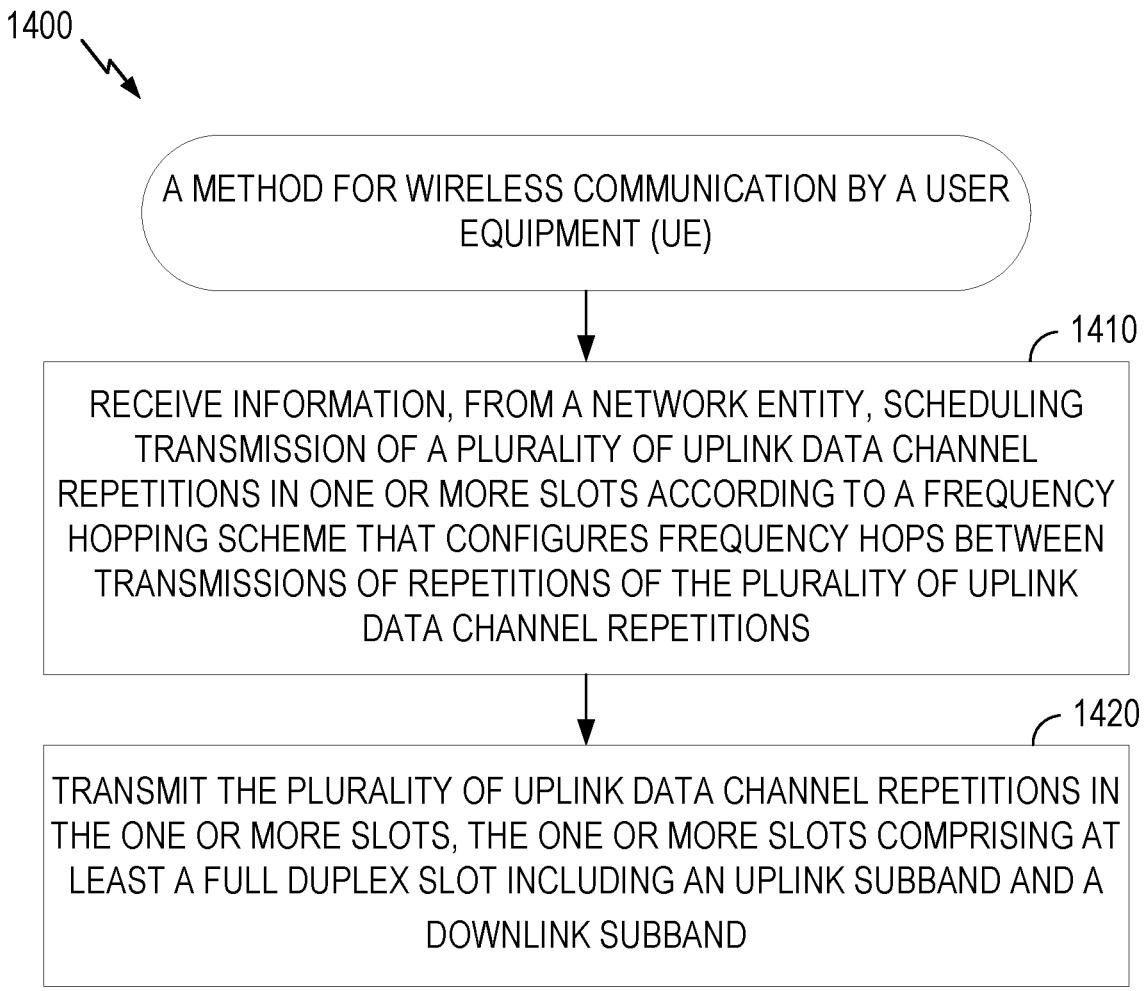
FIG. 14 depicts a method for wireless communication.

FIG. 14 shows a method 1400 for wireless communication by a UE, such as UE 104 of FIGS. 1 and 2.

Method 1400 begins at 1410 with the UE receiving information, from a network entity, scheduling transmission of a plurality of uplink data channel repetitions in one or more slots according to a frequency hopping scheme that configures frequency hops between transmissions of repetitions of the plurality of uplink data channel repetitions.

Method 1400 then proceeds to step 1420 with the UE transmitting the plurality of uplink data channel repetitions in the one or more slots, the one or more slots comprising at least a full duplex slot including an uplink subband and a downlink subband.

In some cases, transmitting in step 1420 the plurality of uplink data channel repetitions in the one or more slots comprises transmitting the plurality of uplink data channel repetitions according to a slot availability rule that takes into account whether frequency hopping resources within the one or more slots are available for transmission of the plurality of uplink data channel repetitions.

In some cases, the information received in block 1410 schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

In some cases, the slot availability rule indicates that the full duplex slot is available for transmission of at least the portion of the first repetition and the portion of the second repetition when the first set of frequency hopping resources associated with the portion of the first repetition and the portion of the second set of frequency hopping resources associated with the second repetition are each included within the uplink subband of the full duplex slot.

In some cases, when the first set of frequency hopping resources associated with the portion of the first repetition and the portion of the second set of frequency hopping resources associated with the second repetition are each included within the uplink subband of the full duplex slot, transmitting the plurality of uplink data channel repetitions in step 1420 comprises transmitting the portion of the first repetition via the first set of frequency hopping resources in the full duplex slot and the portion of the second repetition via the second set of frequency hopping resources in the full duplex slot.

In some cases, the slot availability rule indicates that the full duplex slot is not available when either the first set of frequency hopping resources associated with the portion of the first repetition or the portion of the second set of frequency hopping resources associated with the second repetition are not included within the uplink subband of the full duplex slot. In such cases, transmitting the plurality of uplink data channel repetitions in step 1420 comprises one of: delaying transmission of the portion of the first repetition and the portion of the second repetition and transmitting the portion of the first repetition and the portion of the second repetition in a subsequent available slot in which the first set of frequency hopping resources associated with the portion of the first repetition and the portion of the second set of frequency hopping resources associated with the second repetition are each included within an uplink subband of the subsequent available slot, or dropping transmission of at least one of the portion of the first repetition or the portion of the second repetition in the full duplex slot.

In some cases, the UE is configured to delay transmission of the portion of the first repetition and the portion of the second repetition or drop transmission of the portion of the first repetition and the portion of the second repetition based on a fixed rule or signaling received from the BS. In some cases, the fixed rule indicates to drop transmission of any portion of a repetition, included in a non-available slot, that is equal to or below a threshold number of symbols.

In some cases, the slot availability rule indicates that the full duplex slot is available for transmission when at least one of the first set of frequency hopping resources associated with the portion of the first repetition or the portion of the second set of frequency hopping resources associated with the second repetition are included within the uplink subband of the full duplex slot.

In some cases, the first set of frequency hopping resources associated with the portion of the first repetition are not included within the uplink subband of the full duplex slot and second set of frequency hopping resources associated with the portion of the second repetition are included within the uplink subband of the full duplex slot.

In some cases, transmitting the plurality of uplink data channel repetitions in step 1420 comprises: dropping transmission of the portion of the first repetition in the full duplex slot, and transmitting the portion of the second repetition in the full duplex slot via the second set of frequency hopping resources within the uplink subband of the full duplex slot.

In some cases, transmitting the portion of the second repetition in the full duplex slot via the second set of frequency hopping resources within the uplink subband of the full duplex slot comprises one of: transmitting the portion of the second repetition in the full duplex slot beginning in a symbol of the full duplex slot that occurs sequentially after a last symbol in which the portion of the first repetition was scheduled to be transmitted, or transmitting the portion of the second repetition in the full duplex slot beginning at a first symbol of the full duplex slot.

In some cases, starting resource blocks (RBs) for repetitions of the plurality of uplink data channel repetitions in a non-full duplex slot are different from starting RBs for repetitions of the plurality of uplink data channel repetitions in the full duplex slot, and the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

In some cases, the information received in block 1410 indicates: a first starting RB for the first set of frequency hopping resources for transmitting the portion of the first repetition in the uplink subband of the full duplex slot, a second starting RB for the second set of frequency hopping resources for transmitting the portion of the second repetition in the uplink subband of the full duplex slot, a third starting RB for a third set of frequency hopping resources for transmitting a portion of a third repetition in an uplink subband of the non-full duplex slot, a fourth starting RB for a fourth set of frequency hopping resources for transmitting a portion of a fourth repetition in the uplink subband of the non-full duplex slot, and the first starting RB and the second starting RB are different from the third starting RB and the fourth starting RB.

In some cases, the first set of frequency hopping resources for transmitting the portion of the first repetition and the second set of frequency hopping resources for transmitting the portion of the second repetition are both included within the uplink subband of the full duplex slot, and transmitting the plurality of uplink data channel repetitions comprises: transmitting, based on the first starting RB, the portion of a first repetition via the first set of frequency hopping resources in the uplink subband of the full duplex slot, transmitting, based on the second starting RB, the portion of a second repetition via the second set of frequency hopping resources in the uplink subband of the full duplex slot, transmitting, based on the third starting RB, the portion of a third repetition via the third set of frequency hopping resources in a non-full duplex slot, and transmitting, based on the fourth starting RB, the portion of a fourth repetition via the fourth set of frequency hopping resources in a non-full duplex slot.

In some cases, starting resource blocks (RBs) for repetitions of the plurality of uplink data channel repetitions in a non-full duplex slot are the same as starting RBs for repetitions of the plurality of uplink data channel repetitions in the full duplex slot.

In some cases, repetitions of the plurality of uplink data channel repetitions are scheduled back-to-back.

In some cases, frequency hopping resources within the one or more slots are available for the plurality of uplink data channel repetitions when the frequency hopping resources occur within an uplink subband of the one or more slots.

In some cases, the method 1400 further includes dropping transmission of repetitions of the plurality of uplink data channel repetitions when frequency hopping resources associated with these repetitions do not occur within an uplink subband of the one or more slots.

In some cases, transmitting the plurality of uplink data channel repetitions in the one or more slots in step 1420 comprises transmitting at least two repetitions of the plurality of uplink data channel repetitions within the full duplex slot via a same set of frequency hopping resources within the uplink subband of the full duplex slot defined by a same starting resource block (RB).

Figure 16:
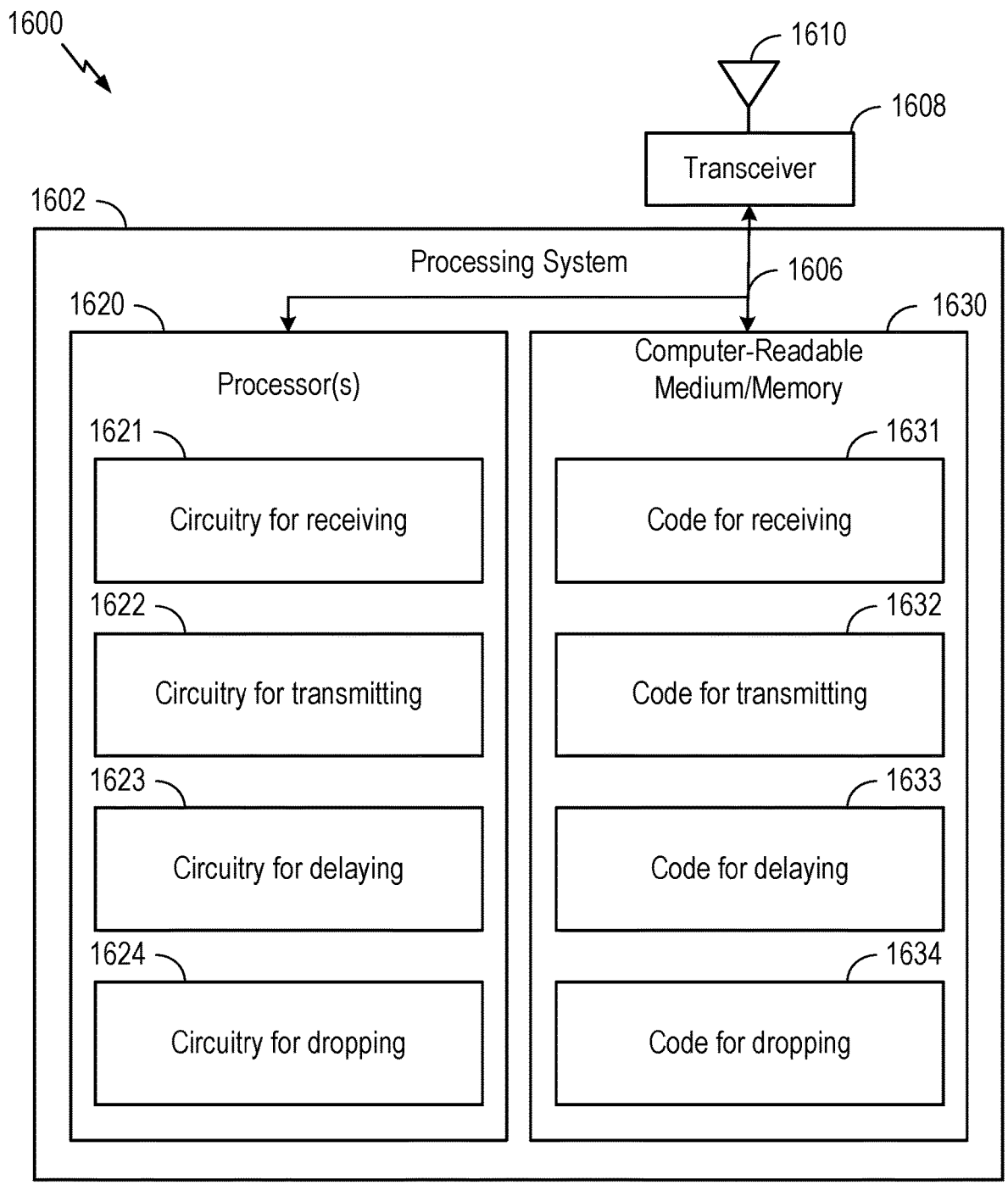
FIG. 16 depicts aspects of an example communications device.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

Example Operations of a Network Entity

Figure 15:
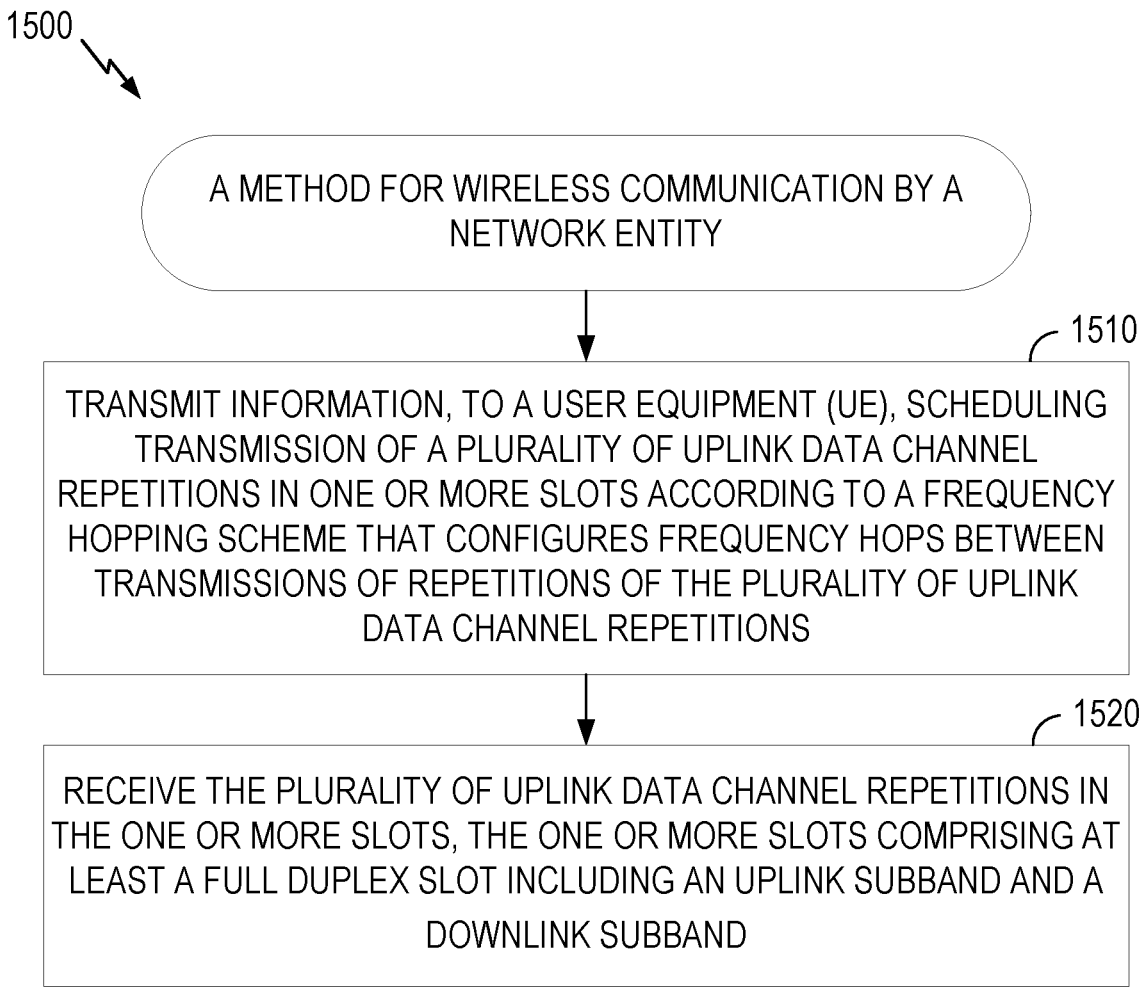
FIG. 15 depicts a method for wireless communication.
Figure 18:
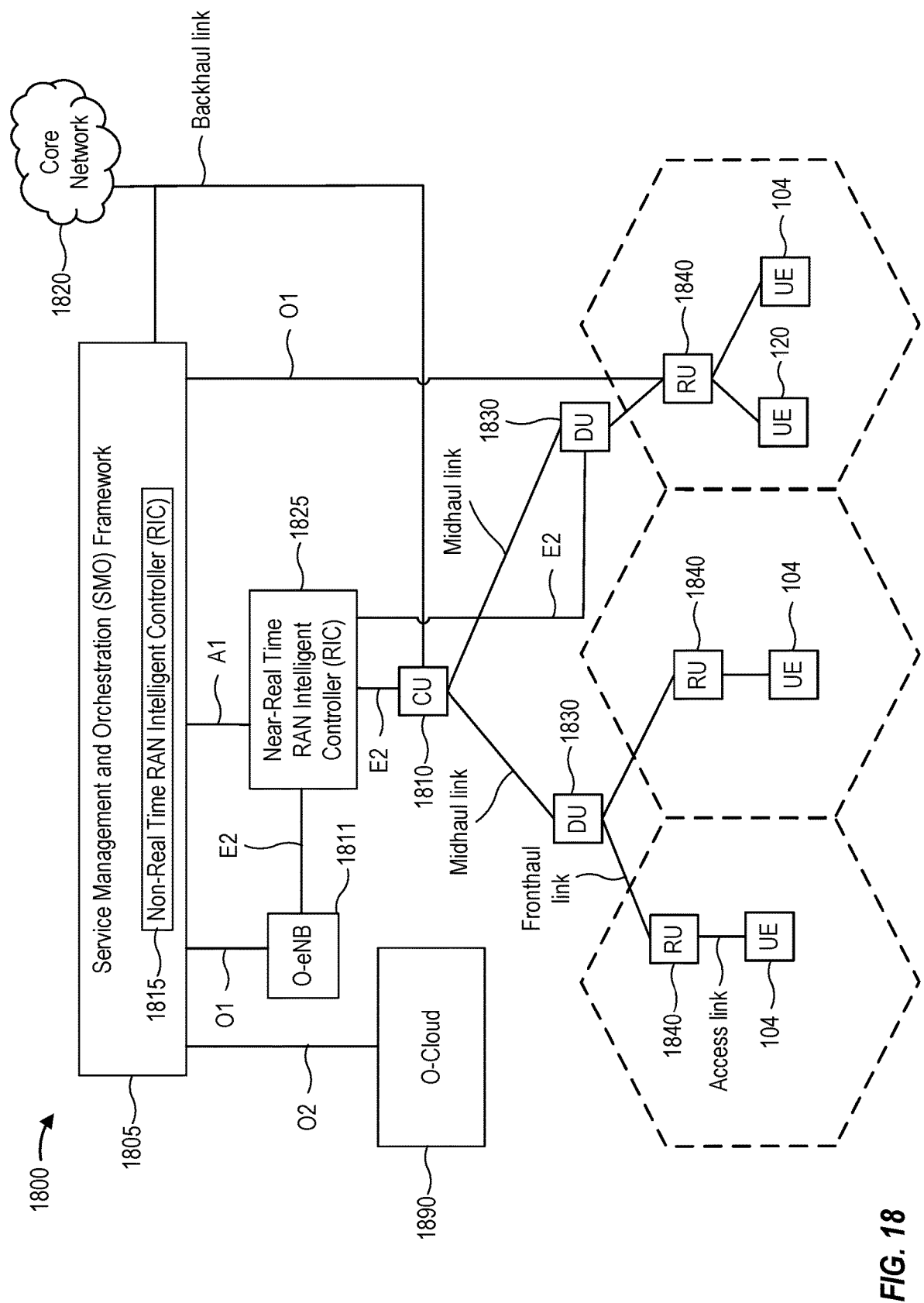
FIG. 18 depicts an example disaggregated base station architecture.

FIG. 15 shows a method 1500 for wireless communication by a network entity, such as BS 102 of FIGS. 1 and 2 or a disaggregated BS described with respect to FIG. 18.

Method 1500 begins at 1510 with the BS transmitting information, to a user equipment (UE), scheduling transmission of a plurality of uplink data channel repetitions in one or more slots according to a frequency hopping scheme that configures frequency hops between transmissions of repetitions of the plurality of uplink data channel repetitions.

Method 1500 then proceeds to step 1520 with the BS receiving the plurality of uplink data channel repetitions in the one or more slots, the one or more slots comprising at least a full duplex slot including an uplink subband and a downlink subband.

In some cases, receiving the plurality of uplink data channel repetitions in the one or more slots in block 1510 comprises receiving the plurality of uplink data channel repetitions according to a slot availability rule that takes into account whether frequency hopping resources within the one or more slots are available for transmission of the plurality of uplink data channel repetitions. In some cases, the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

In some cases, the slot availability rule indicates that the full duplex slot is available for transmission of at least the portion of the first repetition and the portion of the second repetition when the first set of frequency hopping resources associated with the portion of the first repetition and the portion of the second set of frequency hopping resources associated with the second repetition are each included within the uplink subband of the full duplex slot.

In some cases, when the first set of frequency hopping resources associated with the portion of the first repetition and the portion of the second set of frequency hopping resources associated with the second repetition are each included within the uplink subband of the full duplex slot, receiving the plurality of uplink data channel repetitions in block 1510 comprises receiving the portion of the first repetition via the first set of frequency hopping resources in the full duplex slot and the portion of the second repetition via the second set of frequency hopping resources in the full duplex slot.

In some cases, the slot availability rule indicates that the full duplex slot is not available when either the first set of frequency hopping resources associated with the portion of the first repetition or the portion of the second set of frequency hopping resources associated with the second repetition are not included within the uplink subband of the full duplex slot. In such cases, receiving the plurality of uplink data channel repetitions in block 1510 comprises one of: delaying reception of the portion of the first repetition and the portion of the second repetition and receiving the portion of the first repetition and the portion of the second repetition in a subsequent available slot in which the first set of frequency hopping resources associated with the portion of the first repetition and the portion of the second set of frequency hopping resources associated with the second repetition are each included within an uplink subband of the subsequent available slot, or dropping reception of at least one of the portion of the first repetition or the portion of the second repetition in the full duplex slot.

In some cases, the BS is configured to delay reception of the portion of the first repetition and the portion of the second repetition or drop reception of the portion of the first repetition and the portion of the second repetition based on a fixed rule or signaling transmitted to the UE. In some cases, the fixed rule indicates to drop reception of any portion of a repetition, included in a non-available slot, that is equal to or below a threshold number of symbols.

In some cases, the slot availability rule indicates that the full duplex slot is available for transmission when at least one of the first set of frequency hopping resources associated with the portion of the first repetition or the portion of the second set of frequency hopping resources associated with the second repetition are included within the uplink subband of the full duplex slot.

In some cases, the first set of frequency hopping resources associated with the portion of the first repetition are not included within the uplink subband of the full duplex slot and second set of frequency hopping resources associated with the portion of the second repetition are included within the uplink subband of the full duplex slot.

In some cases, receiving the plurality of uplink data channel repetitions comprises: dropping reception of the portion of the first repetition in the full duplex slot, and receiving the portion of the second repetition in the full duplex slot via the second set of frequency hopping resources within the uplink subband of the full duplex slot.

In some cases, receiving the portion of the second repetition in the full duplex slot via the second set of frequency hopping resources within the uplink subband of the full duplex slot comprises one of: receiving the portion of the second repetition in the full duplex slot beginning in a symbol of the full duplex slot that occurs sequentially after a last symbol in which the portion of the first repetition was scheduled to be transmitted, or receiving the portion of the second repetition in the full duplex slot beginning at a first symbol of the full duplex slot.

In some cases, starting resource blocks (RBs) for repetitions of the plurality of uplink data channel repetitions in a non-full duplex slot are different from starting RBs for repetitions of the plurality of uplink data channel repetitions in the full duplex slot. In some cases, the information transmitted in block 1510 schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

In some cases, the information transmitted in block 1510 indicates: a first starting RB for the first set of frequency hopping resources for transmitting the portion of the first repetition in the uplink subband of the full duplex slot, a second starting RB for the second set of frequency hopping resources for transmitting the portion of the second repetition in the uplink subband of the full duplex slot, a third starting RB for a third set of frequency hopping resources for transmitting a portion of a third repetition in an uplink subband of the non-full duplex slot, a fourth starting RB for a fourth set of frequency hopping resources for transmitting a portion of a fourth repetition in the uplink subband of the non-full duplex slot, and the first starting RB and the second starting RB are different from the third starting RB and the fourth starting RB.

In some cases, the first set of frequency hopping resources for transmitting the portion of the first repetition and the second set of frequency hopping resources for transmitting the portion of the second repetition are both included within the uplink subband of the full duplex slot, and receiving the plurality of uplink data channel repetitions in step 1520 comprises: receiving, based on the first starting RB, the portion of a first repetition via the first set of frequency hopping resources in the uplink subband of the full duplex slot, receiving, based on the second starting RB, the portion of a second repetition via the second set of frequency hopping resources in the uplink subband of the full duplex slot, receiving, based on the third starting RB, the portion of a third repetition via the third set of frequency hopping resources in a non-full duplex slot, and receiving, based on the fourth starting RB, the portion of a fourth repetition via the fourth set of frequency hopping resources in a non-full duplex slot.

In some cases, starting resource blocks (RBs) for repetitions of the plurality of uplink data channel repetitions in a non-full duplex slot are the same as starting RBs for repetitions of the plurality of uplink data channel repetitions in the full duplex slot.

In some cases, repetitions of the plurality of uplink data channel repetitions are scheduled back-to-back.

In some cases, frequency hopping resources within the one or more slots are available for the plurality of uplink data channel repetitions when the frequency hopping resources occur within an uplink subband of the one or more slots.

In some cases, method 1500 further includes dropping reception of repetitions of the plurality of uplink data channel repetitions when frequency hopping resources associated with these repetitions do not occur within an uplink subband of the one or more slots.

In some cases, receiving the plurality of uplink data channel repetitions in the one or more slots in step 1520 comprises receiving at least two repetitions of the plurality of uplink data channel repetitions within the full duplex slot via a same set of frequency hopping resources within the uplink subband of the full duplex slot defined by a same starting resource block (RB).

Figure 17:
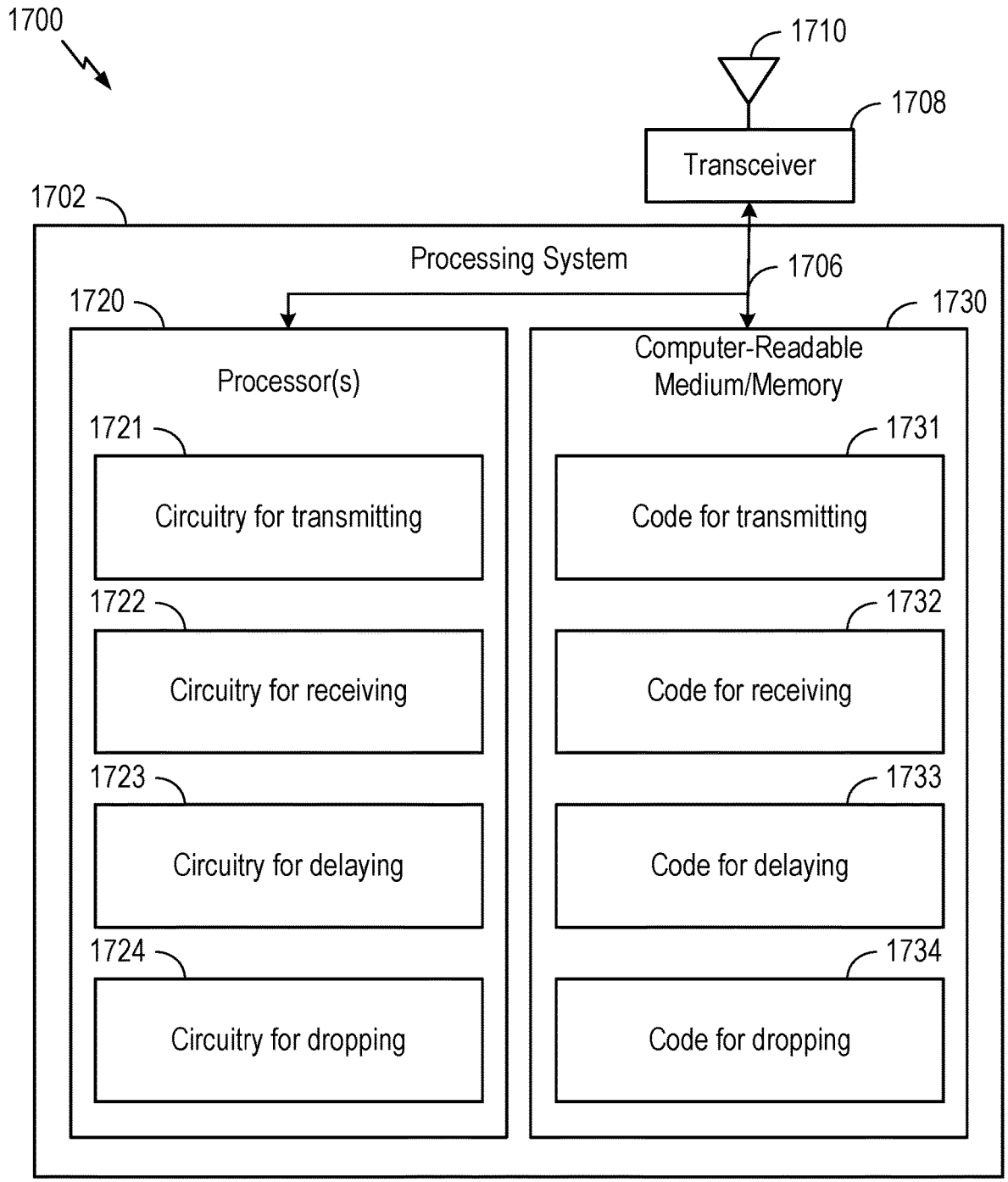
FIG. 17 depicts aspects of an example communications device.

In one aspect, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative steps are possible consistent with this disclosure.

Example Communication Devices

FIG. 16 depicts aspects of an example communications device 1600. In some aspects, communications device 1600 is a user equipment, such as UE 104 described above with respect to FIGS. 1 and 2.

The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes one or more processors 1620. In various aspects, the one or more processors 1620 may be representative of one or more of receive processor 258, transmit processor 264, TX MIMO processor 266, and/or controller/processor 280, as described with respect to FIG. 2. The one or more processors 1620 are coupled to a computer-readable medium/memory 1630 via a bus 1606. In certain aspects, the computer-readable medium/memory 1630 is configured to store instructions (e.g., computer-executable code) that when executed by the one or more processors 1620, cause the one or more processors 1620 to perform the method 1400 described with respect to FIG. 14, or any aspect related to it. Note that reference to a processor performing a function of communications device 1600 may include one or more processors performing that function of communications device 1600.

In the depicted example, computer-readable medium/memory 1630 stores code (e.g., executable instructions) for receiving 1631, code for transmitting 1632, code for delaying 1633, and code for dropping 1634. Processing of the code 1631-1634 may cause the communication device 1600 to perform the method 1400 described with respect to FIG. 14, or any aspect related to it.

The one or more processors 1620 include circuitry configured to implement (e.g., execute) the code stored in the computer-readable medium/memory 1630, including circuitry for receiving 1621, circuitry for transmitting 1622, circuitry for delaying 1623, and circuitry for dropping 1624. Processing with circuitry 1621-1624 may cause the communication device 1600 to perform the method 1400 described with respect to FIG. 14, or any aspect related to it.

Various components of the communications device 1600 may provide means for performing the method 1400 described with respect to FIG. 14, or any aspect related to it. For example, means for transmitting, sending or outputting for transmission may include the transceivers 254 and/or antenna(s) 252 of the UE 104 illustrated in FIG. 2 and/or transceiver 1608 and antenna 1610 of the communication device 1600 in FIG. 16. Means for receiving or obtaining may include the transceivers 254 and/or antenna(s) 252 of the UE 104 illustrated in FIG. 2 and/or transceiver 1608 and antenna 1610 of the communication device 1600 in FIG. 16. Means for dropping and means for delaying may include one or more processors, such as the controller/processor 280, transmit processor 264, receive processor 258, etc. of the UE 104 illustrated in FIG. 2.

FIG. 17 depicts aspects of an example communications device 1700. In some aspects, the communications device 1700 may be an example of the BS 102 depicted and described with respect to FIGS. 1 and 2 or a disaggregated BS described with respect to FIG. 18.

The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes one or more processors 1720. In various aspects, one or more processors 1720 may be representative of one or more of receive processor 238, transmit processor 220, TX MIMO processor 230, and/or controller/processor 240, as described with respect to FIG. 2. The one or more processors 1720 are coupled to a computer-readable medium/memory 1730 via a bus 1706. In certain aspects, the computer-readable medium/memory 1730 is configured to store instructions (e.g., computer-executable code) that when executed by the one or more processors 1720, cause the one or more processors 1720 to perform the method 1500 described with respect to FIG. 15, or any aspect related to it. Note that reference to a processor of communications device 1700 performing a function may include one or more processors of communications device 1700 performing that function.

In the depicted example, the computer-readable medium/memory 1730 stores code (e.g., executable instructions) for transmitting 1731, code for receiving 1732, code for delaying 1733, and code for dropping 1734. Processing of the code 1731-1734 may cause the communication device 1700 to perform the method 1500 described with respect to FIG. 15, or any aspect related to it.

The one or more processors 1720 include circuitry configured to implement (e.g., execute) the code stored in the computer-readable medium/memory 1630, including circuitry for transmitting 1721, circuitry for receiving 1722, circuitry for delaying 1723, and circuitry for dropping 1724. Processing with circuitry 1721-1724 may cause the communication device 1700 to perform the method 1500 as described with respect to FIG. 15, or any aspect related to it.

Various components of the communications device 1600 may provide means for performing the method 1500 as described with respect to FIG. 15, or any aspect related to it. Means for transmitting, sending or outputting for transmission may include the transceivers 232 and/or antenna(s) 234 of the BS 102 illustrated in FIG. 2 and/or transceiver 1708 and antenna 1710 of the communication device 1700 in FIG. 17. Means for receiving or obtaining may include the transceivers 232 and/or antenna(s) 234 of the BS 102 illustrated in FIG. 2 and/or transceiver 1708 and antenna 1710 of the communication device 1700 in FIG. 17. Means for dropping and means for delaying may include one or more processors, such as the controller/processor 240, transmit processor 220, receive processor 238, etc. of the BS 102 illustrated in FIG. 2.

Example Clauses

Implementation examples are described in the following numbered clauses:

Clause 1: A method for wireless communication by a user equipment (UE), comprising: receiving information, from a network entity, scheduling transmission of a plurality of uplink data channel repetitions in one or more slots according to a frequency hopping scheme that configures frequency hops between transmissions of repetitions of the plurality of uplink data channel repetitions; and transmitting the plurality of uplink data channel repetitions in the one or more slots, the one or more slots comprising at least a full duplex slot including an uplink subband and a downlink subband.

Clause 2: The method of Clause 1, wherein: transmitting the plurality of uplink data channel repetitions in the one or more slots comprises transmitting the plurality of uplink data channel repetitions according to a slot availability rule that takes into account whether frequency hopping resources within the one or more slots are available for transmission of the plurality of uplink data channel repetitions, and the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

Clause 3: The method of Clause 2, wherein the slot availability rule indicates that the full duplex slot is available for transmission of at least the portion of the first repetition and the portion of the second repetition when the first set of frequency hopping resources associated with the portion of the first repetition and the portion of the second set of frequency hopping resources associated with the second repetition are each included within the uplink subband of the full duplex slot.

Clause 4: The method of Clause 3, wherein, when the first set of frequency hopping resources associated with the portion of the first repetition and the portion of the second set of frequency hopping resources associated with the second repetition are each included within the uplink subband of the full duplex slot, transmitting the plurality of uplink data channel repetitions comprises transmitting the portion of the first repetition via the first set of frequency hopping resources in the full duplex slot and the portion of the second repetition via the second set of frequency hopping resources in the full duplex slot.

Clause 5: The method of any one of Clauses 3-4, wherein: the slot availability rule indicates that the full duplex slot is not available when either the first set of frequency hopping resources associated with the portion of the first repetition or the portion of the second set of frequency hopping resources associated with the second repetition are not included within the uplink subband of the full duplex slot, and transmitting the plurality of uplink data channel repetitions comprises one of: delaying transmission of the portion of the first repetition and the portion of the second repetition and transmitting the portion of the first repetition and the portion of the second repetition in a subsequent available slot in which the first set of frequency hopping resources associated with the portion of the first repetition and the portion of the second set of frequency hopping resources associated with the second repetition are each included within an uplink subband of the subsequent available slot, or dropping transmission of at least one of the portion of the first repetition or the portion of the second repetition in the full duplex slot.

Clause 6: The method of Clause 5, wherein the UE is configured to delay transmission of the portion of the first repetition and the portion of the second repetition or drop transmission of the portion of the first repetition and the portion of the second repetition based on a fixed rule or signaling received from the BS.

Clause 7: The method of Clause 6, wherein the fixed rule indicates to drop transmission of any portion of a repetition, included in a non-available slot, that is equal to or below a threshold number of symbols.

Clause 8: The method of Clause 2, wherein the slot availability rule indicates that the full duplex slot is available for transmission when at least one of the first set of frequency hopping resources associated with the portion of the first repetition or the portion of the second set of frequency hopping resources associated with the second repetition are included within the uplink subband of the full duplex slot.

Clause 9: The method of Clause 8, wherein the first set of frequency hopping resources associated with the portion of the first repetition are not included within the uplink subband of the full duplex slot and second set of frequency hopping resources associated with the portion of the second repetition are included within the uplink subband of the full duplex slot.

Clause 10: The method of Clause 9, wherein transmitting the plurality of uplink data channel repetitions comprises: dropping transmission of the portion of the first repetition in the full duplex slot, and transmitting the portion of the second repetition in the full duplex slot via the second set of frequency hopping resources within the uplink subband of the full duplex slot.

Clause 11: The method of Clause 10, wherein transmitting the portion of the second repetition in the full duplex slot via the second set of frequency hopping resources within the uplink subband of the full duplex slot comprises one of: transmitting the portion of the second repetition in the full duplex slot beginning in a symbol of the full duplex slot that occurs sequentially after a last symbol in which the portion of the first repetition was scheduled to be transmitted, or transmitting the portion of the second repetition in the full duplex slot beginning at a first symbol of the full duplex slot.

Clause 12: The method of any one of Clauses 1-11, wherein: starting resource blocks (RBs) for repetitions of the plurality of uplink data channel repetitions in a non-full duplex slot are different from starting RBs for repetitions of the plurality of uplink data channel repetitions in the full duplex slot, and the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

Clause 13: The method of Clause 12, wherein the information indicates: a first starting RB for the first set of frequency hopping resources for transmitting the portion of the first repetition in the uplink subband of the full duplex slot, a second starting RB for the second set of frequency hopping resources for transmitting the portion of the second repetition in the uplink subband of the full duplex slot, a third starting RB for a third set of frequency hopping resources for transmitting a portion of a third repetition in an uplink subband of the non-full duplex slot, a fourth starting RB for a fourth set of frequency hopping resources for transmitting a portion of a fourth repetition in the uplink subband of the non-full duplex slot, and the first starting RB and the second starting RB are different from the third starting RB and the fourth starting RB.

Clause 14: The method of Clause 13, wherein: the first set of frequency hopping resources for transmitting the portion of the first repetition and the second set of frequency hopping resources for transmitting the portion of the second repetition are both included within the uplink subband of the full duplex slot, and transmitting the plurality of uplink data channel repetitions comprises: transmitting, based on the first starting RB, the portion of a first repetition via the first set of frequency hopping resources in the uplink subband of the full duplex slot, transmitting, based on the second starting RB, the portion of a second repetition via the second set of frequency hopping resources in the uplink subband of the full duplex slot, transmitting, based on the third starting RB, the portion of a third repetition via the third set of frequency hopping resources in a non-full duplex slot, and transmitting, based on the fourth starting RB, the portion of a fourth repetition via the fourth set of frequency hopping resources in a non-full duplex slot.

Clause 15: The method of Clause 2, wherein starting resource blocks (RBs) for repetitions of the plurality of uplink data channel repetitions in a non-full duplex slot are the same as starting RBs for repetitions of the plurality of uplink data channel repetitions in the full duplex slot.

Clause 16: The method of any one of Clauses 1-15, wherein repetitions of the plurality of uplink data channel repetitions are scheduled back-to-back.

Clause 17: The method of any one of Clauses 1-16, wherein frequency hopping resources within the one or more slots are available for the plurality of uplink data channel repetitions when the frequency hopping resources occur within an uplink subband of the one or more slots.

Clause 18: The method of Clause 1, further comprising dropping transmission of repetitions of the plurality of uplink data channel repetitions when frequency hopping resources associated with these repetitions do not occur within an uplink subband of the one or more slots.

Clause 19: The method of Clause 1, wherein transmitting the plurality of uplink data channel repetitions in the one or more slots comprises transmitting at least two repetitions of the plurality of uplink data channel repetitions within the full duplex slot via a same set of frequency hopping resources within the uplink subband of the full duplex slot defined by a same starting resource block (RB).

Clause 20: A method for wireless communication by a network entity, comprising: transmitting information, to a user equipment (UE), scheduling transmission of a plurality of uplink data channel repetitions in one or more slots according to a frequency hopping scheme that configures frequency hops between transmissions of repetitions of the plurality of uplink data channel repetitions; and receiving the plurality of uplink data channel repetitions in the one or more slots, the one or more slots comprising at least a full duplex slot including an uplink subband and a downlink subband.

Clause 21: The method of Clause 20, wherein: receiving the plurality of uplink data channel repetitions in the one or more slots comprises receiving the plurality of uplink data channel repetitions according to a slot availability rule that takes into account whether frequency hopping resources within the one or more slots are available for transmission of the plurality of uplink data channel repetitions, and the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

Clause 22: The method of Clause 21, wherein the slot availability rule indicates that the full duplex slot is available for transmission of at least the portion of the first repetition and the portion of the second repetition when the first set of frequency hopping resources associated with the portion of the first repetition and the portion of the second set of frequency hopping resources associated with the second repetition are each included within the uplink subband of the full duplex slot.

Clause 23: The method of Clause 22, wherein, when the first set of frequency hopping resources associated with the portion of the first repetition and the portion of the second set of frequency hopping resources associated with the second repetition are each included within the uplink subband of the full duplex slot, receiving the plurality of uplink data channel repetitions comprises receiving the portion of the first repetition via the first set of frequency hopping resources in the full duplex slot and the portion of the second repetition via the second set of frequency hopping resources in the full duplex slot.

Clause 24: The method of any one of Clauses 22-23, wherein: the slot availability rule indicates that the full duplex slot is not available when either the first set of frequency hopping resources associated with the portion of the first repetition or the portion of the second set of frequency hopping resources associated with the second repetition are not included within the uplink subband of the full duplex slot, and receiving the plurality of uplink data channel repetitions comprises one of: delaying reception of the portion of the first repetition and the portion of the second repetition and receiving the portion of the first repetition and the portion of the second repetition in a subsequent available slot in which the first set of frequency hopping resources associated with the portion of the first repetition and the portion of the second set of frequency hopping resources associated with the second repetition are each included within an uplink subband of the subsequent available slot, or dropping reception of at least one of the portion of the first repetition or the portion of the second repetition in the full duplex slot.

Clause 25: The method of Clause 24, wherein the network entity is configured to delay reception of the portion of the first repetition and the portion of the second repetition or drop reception of the portion of the first repetition and the portion of the second repetition based on a fixed rule or signaling transmitted to the UE.

Clause 26: The method of Clause 25, wherein the fixed rule indicates to drop reception of any portion of a repetition, included in a non-available slot, that is equal to or below a threshold number of symbols.

Clause 27: The method of Clause 21, wherein the slot availability rule indicates that the full duplex slot is available for transmission when at least one of the first set of frequency hopping resources associated with the portion of the first repetition or the portion of the second set of frequency hopping resources associated with the second repetition are included within the uplink subband of the full duplex slot.

Clause 28: The method of Clause 27, wherein the first set of frequency hopping resources associated with the portion of the first repetition are not included within the uplink subband of the full duplex slot and second set of frequency hopping resources associated with the portion of the second repetition are included within the uplink subband of the full duplex slot.

Clause 29: The method of Clause 28, wherein receiving the plurality of uplink data channel repetitions comprises: dropping reception of the portion of the first repetition in the full duplex slot, and receiving the portion of the second repetition in the full duplex slot via the second set of frequency hopping resources within the uplink subband of the full duplex slot.

Clause 30: The method of Clause 29, wherein receiving the portion of the second repetition in the full duplex slot via the second set of frequency hopping resources within the uplink subband of the full duplex slot comprises one of: receiving the portion of the second repetition in the full duplex slot beginning in a symbol of the full duplex slot that occurs sequentially after a last symbol in which the portion of the first repetition was scheduled to be transmitted, or receiving the portion of the second repetition in the full duplex slot beginning at a first symbol of the full duplex slot.

Clause 31: The method of any one of Clauses 20-30, wherein: starting resource blocks (RBs) for repetitions of the plurality of uplink data channel repetitions in a non-full duplex slot are different from starting RBs for repetitions of the plurality of uplink data channel repetitions in the full duplex slot, and the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

Clause 32: The method of Clause 31, wherein the information indicates: a first starting RB for the first set of frequency hopping resources for transmitting the portion of the first repetition in the uplink subband of the full duplex slot, a second starting RB for the second set of frequency hopping resources for transmitting the portion of the second repetition in the uplink subband of the full duplex slot, a third starting RB for a third set of frequency hopping resources for transmitting a portion of a third repetition in an uplink subband of the non-full duplex slot, a fourth starting RB for a fourth set of frequency hopping resources for transmitting a portion of a fourth repetition in the uplink subband of the non-full duplex slot, and the first starting RB and the second starting RB are different from the third starting RB and the fourth starting RB.

Clause 33: The method of Clause 32, wherein: the first set of frequency hopping resources for transmitting the portion of the first repetition and the second set of frequency hopping resources for transmitting the portion of the second repetition are both included within the uplink subband of the full duplex slot, and receiving the plurality of uplink data channel repetitions comprises: receiving, based on the first starting RB, the portion of a first repetition via the first set of frequency hopping resources in the uplink subband of the full duplex slot, receiving, based on the second starting RB, the portion of a second repetition via the second set of frequency hopping resources in the uplink subband of the full duplex slot, receiving, based on the third starting RB, the portion of a third repetition via the third set of frequency hopping resources in a non-full duplex slot, and receiving, based on the fourth starting RB, the portion of a fourth repetition via the fourth set of frequency hopping resources in a non-full duplex slot.

Clause 34: The method of Clause 21, wherein starting resource blocks (RBs) for repetitions of the plurality of uplink data channel repetitions in a non-full duplex slot are the same as starting RBs for repetitions of the plurality of uplink data channel repetitions in the full duplex slot.

Clause 35: The method of any one of Clauses 20-34, wherein repetitions of the plurality of uplink data channel repetitions are scheduled back-to-back.

Clause 36: The method of any one of Clauses 20-35, wherein frequency hopping resources within the one or more slots are available for the plurality of uplink data channel repetitions when the frequency hopping resources occur within an uplink subband of the one or more slots.

Clause 37: The method of Clause 20, further comprising dropping reception of repetitions of the plurality of uplink data channel repetitions when frequency hopping resources associated with these repetitions do not occur within an uplink subband of the one or more slots.

Clause 38: The method of Clause 20, wherein receiving the plurality of uplink data channel repetitions in the one or more slots comprises receiving at least two repetitions of the plurality of uplink data channel repetitions within the full duplex slot via a same set of frequency hopping resources within the uplink subband of the full duplex slot defined by a same starting resource block (RB).

Clause 39: An apparatus, comprising: a memory comprising executable instructions; and a processor configured to execute the executable instructions and cause the apparatus to perform a method in accordance with any one of Clauses 1-38.

Clause 40: An apparatus, comprising means for performing a method in accordance with any one of Clauses 1-38.

Clause 41: A non-transitory computer-readable medium comprising executable instructions that, when executed by a processor of an apparatus, cause the apparatus to perform a method in accordance with any one of Clauses 1-38.

Clause 42: A computer program product embodied on a computer-readable storage medium comprising code for performing a method in accordance with any one of Clauses 1-38.

Additional Wireless Communication Network Considerations

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

Returning to FIG. 1, various aspects of the present disclosure may be performed within the example wireless communication network 100.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

While BSs 102 are depicted in various aspects as unitary communication devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 18 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an Si interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

As noted above, FIG. 16 depicts an example disaggregated base station 1600 architecture. The disaggregated base station 1600 architecture may include one or more central units (CUs) 1610 that can communicate directly with a core network 1620 via a backhaul link, or indirectly with the core network 1620 through one or more disaggregated base station units (such as a Near-Real Time (Near-RT) RAN Intelligent Controller (MC) 1625 via an E2 link, or a Non-Real Time (Non-RT) MC 1615 associated with a Service Management and Orchestration (SMO) Framework 1605, or both). A CU 1610 may communicate with one or more distributed units (DUs) 1630 via respective midhaul links, such as an F1 interface. The DUs 1630 may communicate with one or more radio units (RUs) 1640 via respective fronthaul links. The RUs 1640 may communicate with respective UEs 104 via one or more radio frequency (RF) access links. In some implementations, the UE 104 may be simultaneously served by multiple RUs 1640.

Each of the units, i.e., the CUs 1610, the DUs 1630, the RUs 1640, as well as the Near-RT RICs 1625, the Non-RT RICs 1615 and the SMO Framework 1605, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1610 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1610. The CU 1610 may be configured to handle user plane functionality (i.e., Central Unit-User Plane (CU-UP)), control plane functionality (i.e., Central Unit-Control Plane (CU-CP)), or a combination thereof. In some implementations, the CU 1610 can be logically split into one or more CU-UP units and one or more CU-CP units. The CU-UP unit can communicate bidirectionally with the CU-CP unit via an interface, such as the E1 interface when implemented in an O-RAN configuration. The CU 1610 can be implemented to communicate with the DU 1630, as necessary, for network control and signaling.

The DU 1630 may correspond to a logical unit that includes one or more base station functions to control the operation of one or more RUs 1640. In some aspects, the DU 1630 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1630 may further host one or more low PHY layers. Each layer (or module) can be implemented with an interface configured to communicate signals with other layers (and modules) hosted by the DU 1630, or with the control functions hosted by the CU 1610.

Lower-layer functionality can be implemented by one or more RUs 1640. In some deployments, an RU 1640, controlled by a DU 1630, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1640 can be implemented to handle over the air (OTA) communication with one or more UEs 104. In some implementations, real-time and non-real-time aspects of control and user plane communication with the RU(s) 1640 can be controlled by the corresponding DU 1630. In some scenarios, this configuration can enable the DU(s) 1630 and the CU 1610 to be implemented in a cloud-based RAN architecture, such as a vRAN architecture.

The SMO Framework 1605 may be configured to support RAN deployment and provisioning of non-virtualized and virtualized network elements. For non-virtualized network elements, the SMO Framework 1605 may be configured to support the deployment of dedicated physical resources for RAN coverage requirements which may be managed via an operations and maintenance interface (such as an O1 interface). For virtualized network elements, the SMO Framework 1605 may be configured to interact with a cloud computing platform (such as an open cloud (O-Cloud) 1690) to perform network element life cycle management (such as to instantiate virtualized network elements) via a cloud computing platform interface (such as an O2 interface). Such virtualized network elements can include, but are not limited to, CUs 1610, DUs 1630, RUs 1640 and Near-RT RICs 1625. In some implementations, the SMO Framework 1605 can communicate with a hardware aspect of a 4G RAN, such as an open eNB (O-eNB) 1611, via an O1 interface. Additionally, in some implementations, the SMO Framework 1605 can communicate directly with one or more RUs 1640 via an O1 interface. The SMO Framework 1605 also may include a Non-RT RIC 1615 configured to support functionality of the SMO Framework 1605.

The Non-RT RIC 1615 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1625. The Non-RT RIC 1615 may be coupled to or communicate with (such as via an A1 interface) the Near-RT RIC 1625. The Near-RT RIC 1625 may be configured to include a logical function that enables near-real-time control and optimization of RAN elements and resources via data collection and actions over an interface (such as via an E2 interface) connecting one or more CUs 1610, one or more DUs 1630, or both, as well as an O-eNB, with the Near-RT RIC 1625.

In some implementations, to generate AI/ML models to be deployed in the Near-RT RIC 1625, the Non-RT RIC 1615 may receive parameters or external enrichment information from external servers. Such information may be utilized by the Near-RT RIC 1625 and may be received at the SMO Framework 1605 or the Non-RT RIC 1615 from non-network data sources or from network functions. In some examples, the Non-RT RIC 1615 or the Near-RT RIC 1625 may be configured to tune RAN behavior or performance. For example, the Non-RT RIC 1615 may monitor long-term trends and patterns for performance and employ AI/ML models to perform corrective actions through the SMO Framework 1605 (such as reconfiguration via O1) or via creation of RAN management policies (such as A1 policies).

Returning to FIG. 2, various example components of a BS 102 and a UE 104 are depicted, which may be used to implement aspects of the present disclosure.

In regards to an example downlink transmission, BS 102 includes a transmit processor 220 that may receive data from a data source 212 and control information from a controller/processor 240. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

In order to receive the downlink transmission, UE 104 includes antennas 252a-252r that may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

In regards to an example uplink transmission, UE 104 further includes a transmit processor 264 that may receive and process data (e.g., for the PUSCH) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, and other aspects described herein.

In various aspects, UE 104 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and other aspects described herein.

In some aspects, a processor may be configured to perform various operations, such as those associated with the methods described herein, and transmit (output) to or receive (obtain) data from another interface that is configured to transmit or receive, respectively, the data.

As above, FIGS. 3A, 3B, 3C, and 3D depict various example aspects of data structures that may be used in wireless communication network 100 of FIG. 1.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 3B and 3D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 3A and 3C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 3A, 3B, 3C, and 3D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
   receiving information, from a network entity, scheduling transmission of a plurality of uplink data channel repetitions in one or more slots according to a frequency hopping scheme that configures frequency hops between transmissions of repetitions of the plurality of uplink data channel repetitions; and
   transmitting the plurality of uplink data channel repetitions in the one or more slots, the one or more slots comprising at least a full duplex slot including an uplink subband and a downlink subband.

2. The method of claim 1, wherein:
   transmitting the plurality of uplink data channel repetitions in the one or more slots comprises transmitting the plurality of uplink data channel repetitions according to a slot availability rule that takes into account whether frequency hopping resources within the one or more slots are available for transmission of the plurality of uplink data channel repetitions, and
   the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

3. The method of claim 2, wherein the slot availability rule indicates that the full duplex slot is available for transmission of at least the portion of the first repetition and the portion of the second repetition when the first set of frequency hopping resources associated with the portion of the first repetition and the portion of the second set of frequency hopping resources associated with the second repetition are each included within the uplink subband of the full duplex slot.

4. The method of claim 3, wherein, when the first set of frequency hopping resources associated with the portion of the first repetition and the portion of the second set of frequency hopping resources associated with the second repetition are each included within the uplink subband of the full duplex slot, transmitting the plurality of uplink data channel repetitions comprises transmitting the portion of the first repetition via the first set of frequency hopping resources in the full duplex slot and the portion of the second repetition via the second set of frequency hopping resources in the full duplex slot.

5. The method of claim 3, wherein:
   the slot availability rule indicates that the full duplex slot is not available when either the first set of frequency hopping resources associated with the portion of the first repetition or the portion of the second set of frequency hopping resources associated with the second repetition are not included within the uplink subband of the full duplex slot, and transmitting the plurality of uplink data channel repetitions comprises one of:

delaying transmission of the portion of the first repetition and the portion of the second repetition and transmitting the portion of the first repetition and the portion of the second repetition in a subsequent available slot in which the first set of frequency hopping resources associated with the portion of the first repetition and the portion of the second set of frequency hopping resources associated with the second repetition are each included within an uplink subband of the subsequent available slot, or dropping transmission of at least one of the portion of the first repetition or the portion of the second repetition in the full duplex slot.

6. The method of claim 5, wherein the UE is configured to delay transmission of the portion of the first repetition and the portion of the second repetition or drop transmission of the portion of the first repetition and the portion of the second repetition based on a fixed rule or signaling received from the BS.

7. The method of claim 6, wherein the fixed rule indicates to drop transmission of any portion of a repetition, included in a non-available slot, that is equal to or below a threshold number of symbols.

8. The method of claim 2, wherein the slot availability rule indicates that the full duplex slot is available for transmission when at least one of the first set of frequency hopping resources associated with the portion of the first repetition or the portion of the second set of frequency hopping resources associated with the second repetition are included within the uplink subband of the full duplex slot.

9. The method of claim 8, wherein the first set of frequency hopping resources associated with the portion of the first repetition are not included within the uplink subband of the full duplex slot and second set of frequency hopping resources associated with the portion of the second repetition are included within the uplink subband of the full duplex slot.

10. The method of claim 9, wherein transmitting the plurality of uplink data channel repetitions comprises:

dropping transmission of the portion of the first repetition in the full duplex slot, and transmitting the portion of the second repetition in the full duplex slot via the second set of frequency hopping resources within the uplink subband of the full duplex slot.

11. The method of claim 10, wherein transmitting the portion of the second repetition in the full duplex slot via the second set of frequency hopping resources within the uplink subband of the full duplex slot comprises one of:

transmitting the portion of the second repetition in the full duplex slot beginning in a symbol of the full duplex slot that occurs sequentially after a last symbol in which the portion of the first repetition was scheduled to be transmitted, or transmitting the portion of the second repetition in the full duplex slot beginning at a first symbol of the full duplex slot.

12. The method of claim 1, wherein:

starting resource blocks (RBs) for repetitions of the plurality of uplink data channel repetitions in a non-full duplex slot are different from starting RBs for repetitions of the plurality of uplink data channel repetitions in the full duplex slot, and the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

13. The method of claim 12, wherein the information indicates:

a first starting RB for the first set of frequency hopping resources for transmitting the portion of the first repetition in the uplink subband of the full duplex slot, a second starting RB for the second set of frequency hopping resources for transmitting the portion of the second repetition in the uplink subband of the full duplex slot, a third starting RB for a third set of frequency hopping resources for transmitting a portion of a third repetition in an uplink subband of the non-full duplex slot, a fourth starting RB for a fourth set of frequency hopping resources for transmitting a portion of a fourth repetition in the uplink subband of the non-full duplex slot, and the first starting RB and the second starting RB are different from the third starting RB and the fourth starting RB.

14. The method of claim 13, wherein:

the first set of frequency hopping resources for transmitting the portion of the first repetition and the second set of frequency hopping resources for transmitting the portion of the second repetition are both included within the uplink subband of the full duplex slot, and transmitting the plurality of uplink data channel repetitions comprises:

transmitting, based on the first starting RB, the portion of a first repetition via the first set of frequency hopping resources in the uplink subband of the full duplex slot, transmitting, based on the second starting RB, the portion of a second repetition via the second set of frequency hopping resources in the uplink subband of the full duplex slot, transmitting, based on the third starting RB, the portion of a third repetition via the third set of frequency hopping resources in a non-full duplex slot, and transmitting, based on the fourth starting RB, the portion of a fourth repetition via the fourth set of frequency hopping resources in a non-full duplex slot.

15. The method of claim 2, wherein starting resource blocks (RBs) for repetitions of the plurality of uplink data channel repetitions in a non-full duplex slot are the same as starting RBs for repetitions of the plurality of uplink data channel repetitions in the full duplex slot.

16. The method of claim 1, wherein repetitions of the plurality of uplink data channel repetitions are scheduled back-to-back.

17. The method of claim 1, wherein frequency hopping resources within the one or more slots are available for the plurality of uplink data channel repetitions when the frequency hopping resources occur within an uplink subband of the one or more slots.

18. The method of claim 1, further comprising dropping transmission of repetitions of the plurality of uplink data channel repetitions when frequency hopping resources associated with these repetitions do not occur within an uplink subband of the one or more slots.

19. The method of claim 1, wherein transmitting the plurality of uplink data channel repetitions in the one or more slots comprises transmitting at least two repetitions of the plurality of uplink data channel repetitions within the full duplex slot via a same set of frequency hopping resources within the uplink subband of the full duplex slot defined by a same starting resource block (RB).

20. An apparatus, comprising:
a memory comprising executable instructions; and
a processor configured to execute the executable instructions and cause the apparatus to:
receive information, from a network entity, scheduling transmission of a plurality of uplink data channel repetitions in one or more slots according to a frequency hopping scheme that configures frequency hops between transmissions of repetitions of the plurality of uplink data channel repetitions; and
transmit the plurality of uplink data channel repetitions in the one or more slots, the one or more slots comprising at least a full duplex slot including an uplink subband and a downlink subband.

21. The apparatus of claim 20, wherein:
in order to transmit the plurality of uplink data channel repetitions in the one or more slots, the processor is further configured to cause the apparatus to transmit the plurality of uplink data channel repetitions according to a slot availability rule that takes into account whether frequency hopping resources within the one or more slots are available for transmission of the plurality of uplink data channel repetitions, and
the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

22. The apparatus of claim 21, wherein the slot availability rule indicates that the full duplex slot is available for transmission of at least the portion of the first repetition and the portion of the second repetition when the first set of frequency hopping resources associated with the portion of the first repetition and the portion of the second set of frequency hopping resources associated with the second repetition are each included within the uplink subband of the full duplex slot.

23. The apparatus of claim 22, wherein, when the first set of frequency hopping resources associated with the portion of the first repetition and the portion of the second set of frequency hopping resources associated with the second repetition are each included within the uplink subband of the full duplex slot, in order to transmit the plurality of uplink data channel repetitions, the processor is further configured to cause the apparatus to transmit the portion of the first repetition via the first set of frequency hopping resources in the full duplex slot and the portion of the second repetition via the second set of frequency hopping resources in the full duplex slot.

24. The apparatus of claim 22, wherein:
the slot availability rule indicates that the full duplex slot is not available when either the first set of frequency hopping resources associated with the portion of the first repetition or the portion of the second set of frequency hopping resources associated with the second repetition are not included within the uplink subband of the full duplex slot, in order to transmit the plurality of uplink data channel repetitions, and the processor is further configured to cause the apparatus to one of:
delay transmission of the portion of the first repetition and the portion of the second repetition and transmitting the portion of the first repetition and the portion of the second repetition in a subsequent available slot in which the first set of frequency hopping resources associated with the portion of the first repetition and the portion of the second set of frequency hopping resources associated with the second repetition are each included within an uplink subband of the subsequent available slot, or
drop transmission of at least one of the portion of the first repetition or the portion of the second repetition in the full duplex slot.

25. The apparatus of claim 21, wherein the slot availability rule indicates that the full duplex slot is available for transmission when at least one of the first set of frequency hopping resources associated with the portion of the first repetition or the portion of the second set of frequency hopping resources associated with the second repetition are included within the uplink subband of the full duplex slot.

26. The apparatus of claim 25, wherein the first set of frequency hopping resources associated with the portion of the first repetition are not included within the uplink subband of the full duplex slot and second set of frequency hopping resources associated with the portion of the second repetition are included within the uplink subband of the full duplex slot.

27. The apparatus of claim 26, wherein, in order to transmit the plurality of uplink data channel repetitions, the processor is further configured to cause the apparatus to:
drop transmission of the portion of the first repetition in the full duplex slot, and
transmit the portion of the second repetition in the full duplex slot via the second set of frequency hopping resources within the uplink subband of the full duplex slot.

28. The apparatus of claim 20, wherein:
starting resource blocks (RBs) for repetitions of the plurality of uplink data channel repetitions in a non-full duplex slot are different from starting RBs for repetitions of the plurality of uplink data channel repetitions in the full duplex slot, and
the information schedules at least a portion of a first repetition of the plurality of uplink data channel repetitions via a first set of frequency hopping resources in the full duplex slot and a portion of a second repetition of the plurality of uplink data channel repetitions via a second set of frequency hopping resources in the full duplex slot.

29. An apparatus, comprising:
means for receiving, information from a network entity, scheduling transmission of a plurality of uplink data channel repetitions in one or more slots according to a frequency hopping scheme that configures frequency hops between transmissions of repetitions of the plurality of uplink data channel repetitions; and
means for transmitting the plurality of uplink data channel repetitions in the one or more slots, the one or more slots comprising at least a full duplex slot including an uplink subband and a downlink subband.

30. A non-transitory computer-readable medium, comprising:
executable instructions that, when executed by a processor of an apparatus, cause the apparatus to:

receive information, from a network entity, scheduling transmission of a plurality of uplink data channel repetitions in one or more slots according to a frequency hopping scheme that configures frequency hops between transmissions of repetitions of the plurality of uplink data channel repetitions; and transmit the plurality of uplink data channel repetitions in the one or more slots, the one or more slots comprising at least a full duplex slot including an uplink subband and a downlink subband.

* * * * *